United States Patent
Riddiford et al.

(10) Patent No.: US 12,041,192 B2
(45) Date of Patent: Jul. 16, 2024

(54) MOBILE TERMINAL WITH SLIDING SHELLS

(71) Applicant: PLANET COMPUTERS LTD., Bromley (GB)

(72) Inventors: Martin Riddiford, Bromley (GB); Janko Mrsic-Flogel, Bromley (GB); Sebastian Ng Lei, Bromley (GB)

(73) Assignee: PLANET COMPUTERS LTD., Bromley (GB)

( * ) Notice: Subject to any disclaimer, the term of this patent is extended or adjusted under 35 U.S.C. 154(b) by 0 days.

(21) Appl. No.: 17/802,199

(22) PCT Filed: Feb. 24, 2021

(86) PCT No.: PCT/GB2021/050475
§ 371 (c)(1),
(2) Date: Aug. 25, 2022

(87) PCT Pub. No.: WO2021/171017
PCT Pub. Date: Sep. 2, 2021

(65) Prior Publication Data
US 2023/0179691 A1 Jun. 8, 2023

(30) Foreign Application Priority Data

Feb. 25, 2020 (GB) .................................. 2002660

(51) Int. Cl.
*H04M 1/02* (2006.01)
(52) U.S. Cl.
CPC ................................ *H04M 1/0235* (2013.01)

(58) Field of Classification Search
CPC ............. H04M 1/0235; H04M 1/0237; H04M 1/0239; H04M 1/0247; G06F 1/1647; G06F 2200/1613; G06F 1/1624
See application file for complete search history.

(56) References Cited

U.S. PATENT DOCUMENTS

| 8,060,165 | B2 * | 11/2011 | Kim .................. G06F 1/1686 |
| | | | 455/90.3 |
| 8,108,017 | B2 * | 1/2012 | Jang .................. G06F 1/1647 |
| | | | 455/90.3 |
| D660,273 | S  * | 5/2012 | Jung .................. D14/138 G |
| 8,254,093 | B2 * | 8/2012 | Wu .................... H04M 1/0237 |
| | | | 361/679.01 |

(Continued)

FOREIGN PATENT DOCUMENTS

WO    2009085539 A2    7/2009

OTHER PUBLICATIONS

International Search Report, dated Aug. 17, 2021, issued in International Application No. PCT/GB2021/050475.

*Primary Examiner* — Lewis G West
(74) *Attorney, Agent, or Firm* — Saul Ewing LLP

(57) ABSTRACT

A portable, electronic device configured to transform between a smartphone usage mode and a keyboard-based usage mode. The device includes (i) a base section and (ii) a top section that includes a touchscreen display that sits over the base section when the device is in the smartphone mode. A sliding carriage system enables the top section to both (i) slide back over the base section, moving parallel to a top surface of the base section, and then fully expose the keyboard, and (ii) then pivot so that the display is at a conventional reading angle to the keyboard.

38 Claims, 45 Drawing Sheets

(56) References Cited

U.S. PATENT DOCUMENTS

| | | | | |
|---|---|---|---|---|
| 8,306,584 | B2* | 11/2012 | Yeh | H04M 1/0237 |
| | | | | 455/575.4 |
| 8,760,414 | B2* | 6/2014 | Kim | G06F 1/1692 |
| | | | | 345/169 |
| 2007/0060219 | A1* | 3/2007 | Lin | H04M 1/0235 |
| | | | | 455/575.4 |
| 2007/0174782 | A1* | 7/2007 | Russo | G06F 3/04817 |
| | | | | 715/810 |
| 2009/0163257 | A1* | 6/2009 | Vesamaki | H04M 1/0237 |
| | | | | 455/575.4 |
| 2009/0170574 | A1* | 7/2009 | Harmon | H04M 1/0237 |
| | | | | 455/575.4 |
| 2009/0228790 | A1* | 9/2009 | Chiu | H04M 1/23 |
| | | | | 715/702 |
| 2009/0229081 | A1* | 9/2009 | Demuynck | H04M 1/0277 |
| | | | | 16/362 |
| 2010/0222117 | A1* | 9/2010 | Shin | H04M 1/0237 |
| | | | | 455/575.4 |
| 2011/0041634 | A1* | 2/2011 | Kim | G06F 1/1615 |
| | | | | 74/100.1 |
| 2011/0164354 | A1* | 7/2011 | Wu | H04M 1/0237 |
| | | | | 361/679.01 |
| 2011/0194233 | A1* | 8/2011 | Ahn | G06F 1/1624 |
| | | | | 361/679.01 |

* cited by examiner

MOBILE TERMINAL WITH SLIDING SHELLS

CROSS REFERENCE TO RELATED APPLICATIONS

This application claims the priority of International Application No. PCT/GB2021/050475, filed on Feb. 24, 2021, which claims priority to GB Application No. GB 2002660.5, filed on Feb. 25, 2020, the entire contents of which are fully incorporated herein by reference.

BACKGROUND OF THE INVENTION

1. Field of the Invention

The field of the invention relates to a portable, electronic device configured to transform between two different usage modes. One mode may be a smartphone mode; the other mode may be a keyboard usage mode.

2. Description of the Prior Art

Many devices have attempted to merge the functionality of a smartphone by adding a keyboard. However, the default set up for smartphones is portrait, but for keyboard centric devices such as laptops, it is landscape. This presents a challenge for any device which attempts to bridge the gap between the two. Transforming a device from a smartphone mode to a keyboard mode has been done in numerous devices, starting from the early Nokia 900 communicator, which used a simple clamshell design, like a small laptop. The idea of providing a user with a portable device that can deliver the productivity possible with a proper keyboard with mechanical keys, and yet also function as a smartphone, is attractive. The Gemini device from Planet Computer sought to address this need with another clamshell design; the device would not however function as a conventional smartphone with the lid hinged shut as there was no large touch screen display on the lid.

3. Technical Challenge

The perfect device would appear and behave like a smartphone, in shape, size and positional familiarity of camera and controls, where the upper face is predominately a touch screen with an earpiece and microphone positioned accordingly in the familiar positions. This should be fully operable with one hand. However, when desired by the user, it can be reconfigured to resemble a mini laptop, similar in layout to a Psion Series 3, 5, Planet Gemini and Cosmo. The transition between these two positions should be smooth and ideally achievable with one hand, although when in this format, it is likely to be used by two hands in free air, or with the device resting on a desk, table or lap/knee. This arrangement will always be thicker than a single box design, but to be attractive to potential users, must be as slim as possible.

The familiar clamshell/laptop format is similar to a book, and places the display and keyboard adjacent to each other, with a hinge running between the two, so that the display is folded over the keyboard when the device is closed. This mechanism works well, but both the keyboard and display are hidden inside the "book" when it is folded.

However, when the display is a touchscreen, there is an issue of balance. The display element is generally not opened 180 degrees to be coplanar with the keyboard, but, as it is ergonomically more acceptable, the screen is tilted somewhat towards the user. However, unless there is careful weighting of the two halves or an additional stabiliser, the lid can be unstable when the user touches the screen—either there is not enough resistance in the hinge or the whole device flips over backwards.

Some laptops have a hinge which allows the display and keyboard to be folded in the opposite direction, so that the display and keyboard are on the outside of the folded "book". This mechanism succeeds in positioning the display on the outside, like a smartphone, but the keyboard is on the outside too. This is not acceptable for a pocketable device.

The ideal format splits a smartphone into two thin layers—the top layer houses the display, and the bottom layer houses the keyboard, with both facing upwards. The two layers can move relative to each other to expose the keyboard when needed.

Many devices have attempted this transition with a variety of mechanisms, but have failed to optimise either the opening procedure, or the juxtaposition between the keyboard surface and the touchscreen. Many devices accept that, as the touchscreen element has some thickness, that it is acceptable to position this on top of the keyboard surface plane. The problem with this is that the top row of keys is competing for space with the front edge thickness of the touchscreen display, resulting in a cramped keyboard with no room for fingernails, and a step up to the touchscreen. This step up is ergonomically poor if the software is configured to have a task bar or user configurable function keys at the lower edge of the landscape touchscreen, as it should operate as though it were just another row of keys, and therefore should be at the same level as the keyboard.

It should be noted that the default keyboard arrangement is that of the QWERTY layout (or regional variations). In this layout, the keys are typically square, and in a distinct arrangement and alignment between the rows. Any change to this layout reduces the ability for users to touch-type successfully without a degree of re-learning, as the vectors/angles between the keys will have changed, meaning that the muscle memory is disrupted.

Another important issue is that modern devices have minimal borders around the active areas—the screen is as large as possible in a smartphone mode, and the keyboard should be as large as possible in the laptop/landscape mode. Disrupting these top facing planes is to be avoided.

SUMMARY OF THE INVENTION

The invention is, in one implementation, a portable, electronic device configured to transform between a smartphone usage mode and a keyboard-based usage mode. The device includes (i) a base section and (ii) a top section that includes a touchscreen display that sits over the base section when the device is in the smartphone mode. A sliding carriage system enables the top section to both (i) slide back over the base section, moving parallel to a top surface of the base section, and then fully expose the keyboard, and (ii) then pivot so that the display is at a conventional reading angle to the keyboard.

Further details are in Appendix 1.

BRIEF DESCRIPTION OF THE FIGURES

Implementations of the invention will be described with reference to the following FIGS.:

as shown in FIG. 5, the top section rails can pivot because the front, lower edge of the top section is no longer supported and can hence drop behind the rear edge of the base section.

Figure 1:
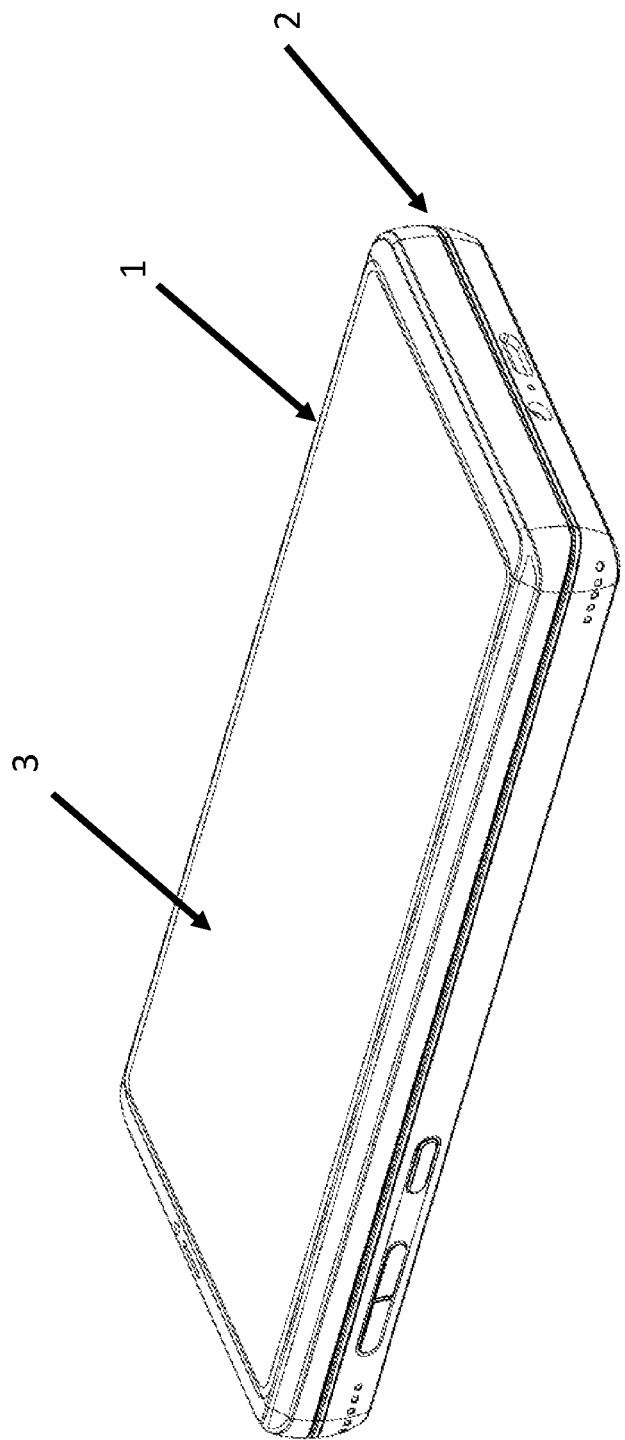
FIG. 1 is a perspective view of a mobile device in 'smartphone' mode; the top section with an integral touchscreen display fully covers the base section.

KEY TO THE FIGURES 1. top section
2. base section
3. touch screen display
4. keyboard
5. sliding carriage
6. hinge on rear foot of the carriage, connecting the carriage to the top section.
7. front edge of top section
8. flap or gap filler at rear of base section
9. rear foot of the carriage
10. roller mounted in top of carriage
11. roller track in top section for the roller
12. top section shell
13. base section shell
14. gap in top section for carriage to move along
15. L-shaped sliding carriage
16. carriage rails in base section
17. spring that biases the carriage towards the front of the base section
18. carriage rails in top section 19. carriage top with guide holes through which the carriage rails in the top section can slide
20. horizontal hinge that enables the carriage rails in the top section to pivot through approximately 32 degrees as the device transforms from smartphone mode to keyboard mode.
21. flexi-cables
22. PCB
23. antenna
24. speaker
25. battery
26. camera unit
27. magnet in top section
28. magnet in bottom section
29. metal strip in the bottom section that the magnet in the top section is attracted to
30. carriage holder
31. internal tensioned cable that ensures that top section remains parallel to the base section when being moved
32. button ('button A') to activate motors to initiate transformation to and from smartphone mode
33. pivot arm connected to motor and joining the top section to the base section
34. guide arm joining the top section to the base section and preventing twisting
35. tray for keyboard that slides in base section
36. internal slide track for keyboard tray
37. stabilising foot at the front of the tray
38. button to activate transformer motors
39. tray motor to turn screw drive
40. screw drive to move tray
41. lip on screw drive that engages with the tray underside to move the tray
42. groove along a side edge of the tray to ensure tray slides in and out smoothly
43. groove along rear edge of the tray that the top section drops down into when the tray is fully extended
44. pivot arm motor that rotates the pivot arm
45. enhanced camera unit in top section
46. enhanced camera lens group in base section

DETAILED DESCRIPTION

One implementation of the invention is a smartphone or other mobile phone device that includes a mechanism which enables a controlled sliding movement between the two halves or sections (e.g. base section with integral keyboard, and top section with integral touchscreen display) of the device; the touchscreen section is slid backwards to fully reveal the keyboard in the base section.

A third element acts as a carriage, linking the two main layers. Preferably, there are a pair of these carriage mechanisms, positioned towards each of the two side edges of the keyboard. The critical aspect in this arrangement is that the carriages are linearly engaged in tracks or rails below the screen and below keyboard, and must be as slim as possible so that they do not drive the total thickness of the device.

The following describes the arrangement between a single carriage and its respective tracks in the display and keyboard elements, from a landscape, laptop point of view.

The display side carriage is short and is able to slide in its track the full depth of the display. It is free to slide in both directions. At the rear of the carriage is a horizontally hinged joint, which connects via a fixed 90 degree crank to a lower linear sliding element which is able to slide in a track underneath the keyboard. This movement is relatively short, and biased towards the front of the keyboard by a spring.

The carriage moves in a fashion dictated by the forces acting on it. The movement from the 'Smartphone position' into the 'Laptop position' can be broken down into 3 separate actions:
1. When the two halves or sections are slid relative to each other, the carriage slides relative to the display or top section track, as the spring keeps the keyboard slider in place. It slides until the carriage reaches the end of its track.
2. The user is minded to keep sliding the display backwards in order to expose the full keyboard. This further movement drives the keyboard sliding element along its track against the force of the spring. Eventually the front edge of the display element travels past the rear edge of the keyboard.
3. At this point the horizontally hinged joint allows the front edge of the display element to drop down over the rear profile of the keyboard element. Because the front edge drops, the screen tilts upwards, until the front edge touches the sliding carriage. The font edge of the screen element and the rear edge of the keyboard element are shaped such that the spring relaxes somewhat during this tilting, acting to clip the screen at this angle. The tilting could be encouraged by magnets and or springs too if required. The resting position can be arranged such that it flush with the rear of the keyboard, avoiding the step up to the touch screen that similar devices typically have.

Because the two halves are not directly held together other than via the horizontally hinged joint, there are several unwanted degrees of freedom beyond the required sliding motion which need to be controlled. For instance, it is possible for the user to try to prise the two elements apart at the front edge, just as you would when opening a laptop. The action of the spring helps control the relationship between the two elements in the open position, but there is nothing in the mechanism assisting in the closed position, although there could be an additional spring in the hinge trying to pull the two elements together.

To compensate for this, attracting magnets are strategically placed near the front corners of each element. These achieve two things—aligning the two elements in this closed position, and also holding them together. However an unwitting user is still likely to be tempted to prise the two elements apart. Strategic shaping of the top edge of the display, a lack of a finger scoop detail, and colour and texture clues can encourage the user to approach the device differently, and to slide rather than lift the lid. However, when in mid-slide, the magnets are sufficiently separated so as to reduce the attractive force between them, there is still a requirement to pull the two elements together. The solution is to have a rail of ferrous material located in the keyboard element under each display element magnet, positioned to each side of the keyboard. The display element is therefore attracted to the ferrous material in the keyboard element over the whole of its sliding travel, but more so at the front where the other magnets are, so the two elements are encouraged to align by the magnet to magnet force, which is stronger than the magnet to ferrous rail force. This ensures that the device feels solid when being used in smartphone mode.

However, if the user were to try to slide the top element with one hand, from one corner say, any resistance in the opposite side sliding mechanism is likely to lead to an unwanted rotation of the display element relative to the keyboard element, in the same way that a wide drawer has a tendency to rotate and jam. The preferred method to counter this is to use a pair of rollers with a fixed axle, where each roller is located close to each front corner on the underside of the display element. The advantage of this arrangement is that, as well as encouraging parallel travel, the rollers reduce friction too, so that the sliding action is smooth, in fact, the more force pulling the elements together, the more grip the rollers will get, and the better they will work. This is important as the frictional force caused by the magnetic attraction added to the downward force likely to be applied by the user when engaging their thumbs with the strategic shaping of the top front edge of the display element could be considerable, and have the potential to jam if any dirt was to get between the sliding surfaces. Additionally, the rollers could be shaped to run in grooves or engage with rails to keep them running straight, thus resisting any rotational motion. It may be advantageous that the rollers are magnets too.

The mechanism described above will achieve a smooth, controlled sliding action during the transition from smartphone to laptop modes. However there are further issues for it to be fully successful in solving the full range of challenges previously posed in the above preamble.

As previously discussed, a touchscreen laptop typically has a stability problem. The carriage mechanism described above solves this problem by emerging from the back edge of the keyboard element. If the underside of the rearmost part of the chassis is exposed so that it is flush with the underside surface when in closed, smartphone mode, it provides a rear stabilising foot which prevents the device from tilting backwards when the touchscreen is used.

Any device that is split into two elements needs a strategy for electrically connecting the halves together. It might be that the two elements have their own batteries, charged separately, and a data connection using short range radio such as Bluetooth to transmit the keystrokes from the keyboard element to the computer in the lid, say. This is not very convenient for the user.

A better solution is make a physical connection between the two halves or sections with just power passing between them. A way of doing this is to have a physical connection only when the device is in the smartphone and laptop modes, and not during the transition between these two modes. This scenario requires both sections to either have batteries, or one half to have a super capacitor to deal with the time they are disconnected. However this arrangement will have problems if the slide is not completed in time, and puts significant demands on the connections.

Better is to have a sliding connection; this avoids the problems outlined above. However, because it is a power connection, it must be a guaranteed low resistance contact throughout its travel.

A preferred option is that a permanent connection is maintained between each element throughout the travel, just like a laptop. This is typically done with a sleeve of twisted cables which run through each hinge. However, many folding and sliding devices use flat flexible cables. For instance, the slide phones of yesteryear used the rolling action of a flat flexible cable, typically made from a flexible printed circuit constructed from copper track sandwiched between thin layers of Kapton polyamide sheet, running through the mechanism.

The carriage mechanism can be constructed to accept a flexible cable running through it and past the horizontal hinge, where the flexible cable is bent back on itself under each sliding part to allow for the positional change from the end connection points to the horizontal hinge in the centre. Each mechanism needs to be wide enough to accommodate a sufficient width of cable to carry all the tracks to make connections between the two elements.

The carriage mechanism can be constructed in numerous ways, but must be capable of being made as thin as possible. One seemingly attractive option is to use a telescopic principle, whereby the carriage runs inside a tube. The tube in the display element needs to be cut away on its underside for the carriage to connect to the lower part of the mechanism via the hinge.

This will produce a stiff assembly, but one which may be prone to bending if subjected to a large force. Unfortunately, this is likely to happen as handheld devices must cope with two types of abuse. First, it must survive being dropped onto the floor in both the closed and open modes and not be so damaged that the slide action doesn't work. Secondly it must be able to survive all the forces that a user might exert on the mechanism.

Because the device opens into a familiar laptop-like format, some users will unconsciously try to operate it as though it had a hinge when opening and closing it, either because they are unfamiliar with the device, or because they are distracted, and try to operate it with a reflex action. Sliding one element relative to the other is an unusual way of opening such a device, and there is a distinct chance that users will try to shut it by trying to fold the display over the keyboard, rather than tilting it and sliding it back over the keyboard.

A stiff, unyielding mechanism has the danger that there is no feedback to the user that they are operating it in the wrong way. It is possible that a sensor could be incorporated to give the user an alert to warn them to not apply any more force, but a more resilient mechanism would ensure a more failsafe solution.

If the carriage were to slide along a pair of rods, instead of the more usual tubes or rails, it can be guided accurately, smoothly, and with minimal rattle or looseness. Because the rods can be made from a spring wire material, they can be allowed to bend somewhat under load, thus helping to absorb any shock from dropping the device, and giving the user feedback that the hinge is being over strained when being opened incorrectly. This arrangement also has the advantage that there is are no unwanted thicknesses required, so the mechanism can be thicker and stronger. If required, these rods could be used to carry the power between the two elements, as described above.

Because the central area in both the display and keyboard sections are similar in size and shape, there is no driver for the positioning of these components, so they could swop position (e.g. keyboard on the top section, with the touchscreen display on the lower section).

This mechanism is equally suited to a twin touchscreen display design, where a second display replaces the keyboard. In this case, the underlying display turns on during the opening process, and, because the edges are thin between the two screens, could display a single enlarged, squarish screen (albeit with a break line through the middle) or two screens. The underlying screen could display a virtual keyboard and much more besides.

In the closed position the screen element is only joined to the keyboard element via the cranked link arm of the carriage. This requires a recess in the keyboard surround if the outer surface of the carriage is to be flush with the main surface of the keyboard element.

Thus a pair of notches would be visible between the rear edge of the keyboard element and the front edge of the display element. If the device were a dark colour, these small notches would be disguised somewhat by the dark colour.

However, they would become more visible if the keyboard surround is a light colour. It is therefore much better if the gaps are able to be filled. It is possible to fill the gap with a small pivoting member which is normally sprung into the covering position, but is pushed out of the way by the inner edge of the carriage when the device is shut. It is hoped that the spring force could be provided by an extended tongue from the key mat.

The Second Motorised Variant

The following section describes a further set of improvements to the functionality of a smartphone. It may use the sliding carriage described above, but does not have to. Many devices have attempted to merge the functionality of a smartphone by adding a keyboard. However, the default set up for smartphones is portrait, but for keyboard centric devices such as laptops, it is landscape. This presents a conundrum for any device which attempts to bridge the gap between the two.

The perfect device would appear and behave like a smartphone, in shape, size and positional familiarity of camera and controls, where the upper face is predominately a touch screen with an earpiece and microphone positioned accordingly in the familiar positions. This should be fully operable with one hand. However, when desired by the user, it can be reconfigured to resemble a mini laptop, similar in layout to a Psion Series 3, 5, Planet Gemini and Cosmo etc. The transition between these two positions should be smooth and ideally achievable with one hand, although when in this format, it is likely to be used by two hands in free air, or with the device resting on a desk, table or lap/knee.

The familiar clamshell/laptop format is similar to a book, and places the display and keyboard adjacent to each other, with a hinge running between the two, so that the display is folded over the keyboard when the device is closed. This mechanism works well, but both the keyboard and display are hidden inside the "book" when it is folded.

This design uses a slide out keyboard try and a fold/flip up display to transform the device from a portrait smartphone into a landscape pocket computer.

Main Features:
Mobile terminal with 5G transceiver and lower xG
Mobile terminal with dual 5G transceivers and lower xG
Mobile terminal with WiFi only etc . . .
Mobile terminal with WiFi 6 etc . . .
mobile device that has one motor
mobile device that has two motors
mobile device has a button A
mobile device has primary display
mobile device has one or more cameras
mobile device has flash module
mobile device has moveable keyboard tray
mobile device has backlit keyboard
primary display with on screen soft button B (drawn on screen)
motorized opening and closing of moveable keyboard tray
latching keyboard tray into position for closed position
latching keyboard tray into position for open position
synchronising keyboard tray motion during open movement with another motorized element
synchronising keyboard tray during open movement with another motorized element
side tracks on side of keyboard tray to guide and maintain smooth linear movement for open or close motion.
front stabiliser reducing keyboard tray vertical motion/keyboard downward pivoting
mobile device that has moveable display
motorized opening and closing of moveable display
latching moveable display into position for closed position
latching moveable display into position for open position
synchronising moveable display motion during open movement with another motorized element
synchronising moveable display motion during closing movement with another motorized element
interference with keyboard tray side tracks on side of keyboard tray to guide and maintain smooth linear movement for open or close motion.
front stabiliser reducing keyboard tray vertical motion/keyboard downward pivoting
keyboard backlight that is flashing (changing backlight intensity) while keyboard tray is moving
Camera module with lens
Camera module closes onto terminal base assembly
Device base assembly contains additional lens set in terminal base assembly that is a aligned with camera module and primary camera lens
terminal base assembly that is a aligned with camera module and primary camera lens
creating a more powerful lens set
creating additional magnification
creating additional focal length
creating additional field of view
Flash module on display assembly closes onto terminal base
Camera module closes onto terminal base
Terminal base contains aligned aperture through which flash can operate
Terminal base contains aligned lens through which flash can operate
Simultaneous motorised action that opens screen and opens keyboard
Simultaneous motorised action that closes screen and closes keyboard
Button A which when pressed actions the opening of screen
Button A which when pressed actions the opening of keyboard
Button A which when pressed actions the non-simultaneous opening of display and opening of keyboard
Button A which when pressed actions the simultaneous opening of display and opening of keyboard
Button A which when pressed actions the closing of screen
Button A which when pressed actions the closing of keyboard
Button A which when pressed actions the non-simultaneous closing of display and closing of keyboard
Button A which when pressed actions the simultaneous closing of display and closing of keyboard
Soft on screen Button B which when pressed actions the opening of screen
Soft on screen Button B which when pressed actions the opening of keyboard
Soft on screen Button B which when pressed actions the non-simultaneous opening of display and opening of keyboard
Soft on screen Button B which when pressed actions the simultaneous opening of display and opening of keyboard
Soft on screen Button B which when pressed actions the closing of screen Soft on screen Button B which when pressed actions the closing of keyboard Soft on screen Button B which when pressed actions the non-simultaneous closing of display and closing of keyboard Soft on screen Button B which when pressed actions the simultaneous closing of display and closing of keyboard Gesture on terminal's primary display which when performed actions the closing of screen Gesture on terminal's primary display which when performed which when pressed actions the closing of keyboard Gesture on terminal's primary display which when performed actions the non-simultaneous closing of display and closing of keyboard Gesture on terminal's primary display which when performed actions the simultaneous closing of display and closing of keyboard Technical Specifications for Both Variants are at Appendix 2.

Implementations of the invention will now be described, referring to FIGS. 1-46. One implementation is a mobile device that can transform from a 'candy bar' form factor smartphone to a keyboard-based portable computer. The device includes (i) a base section with a keyboard and (ii) a top section that includes a touchscreen display that sits over the base section when the device is in its smartphone mode, concealing the keyboard. The top section can be readily slid or moved back over the base section into a second mode that fully exposes the underlying keyboard. The user now has a keyboard-based device; the keys are sufficiently large to enable touch-typing.

FIG. 1 is a perspective view of a mobile device in 'smartphone' usage mode: the top section 1 with an integral touchscreen display 3 fully covers the base section 2; icons and other on screen user interface elements are displayed in a portrait format, as in a conventional smartphone. The device operates hence behaves like a conventional 'candy bar' form factor smartphone.

Figure 2:
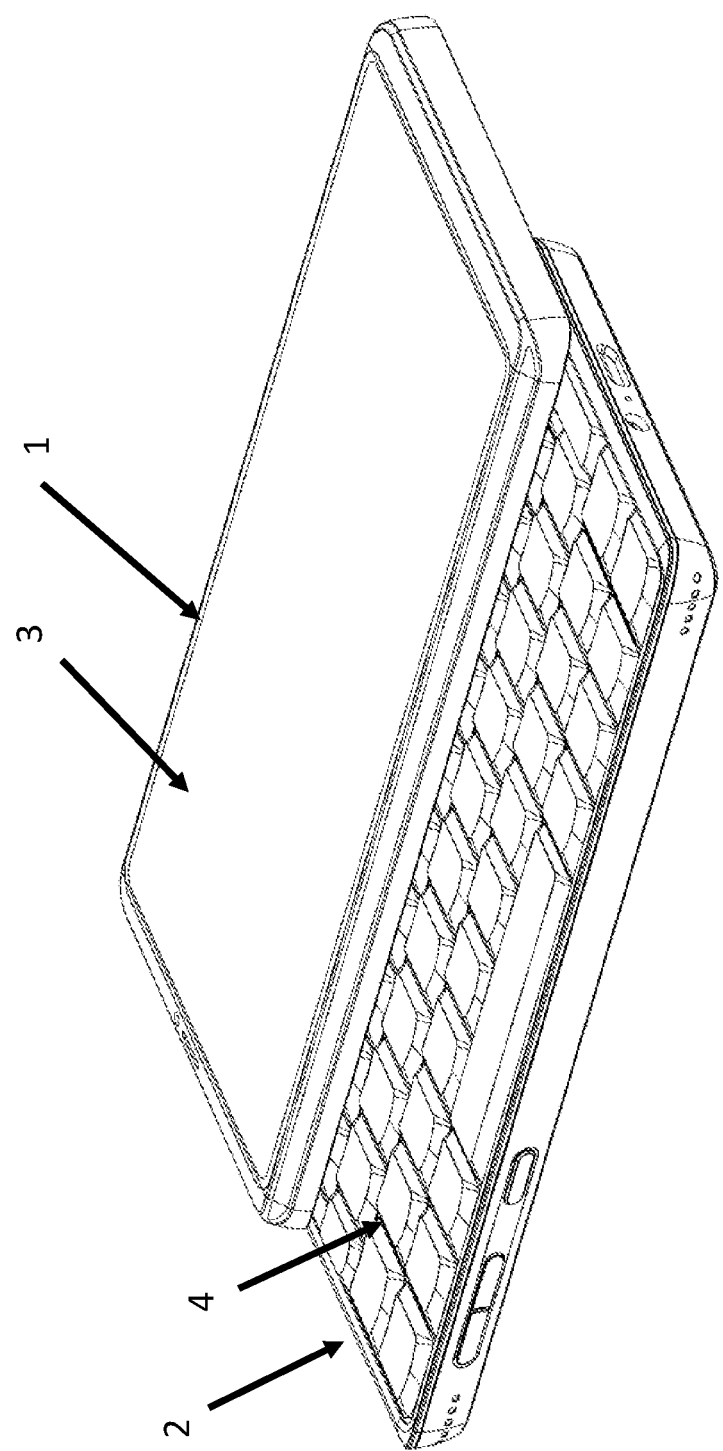
FIG. 2 is a perspective view of the mobile device, showing the device transforming into its 'keyboard' or PC mode, with the top section almost fully slid back, staying parallel to the base and revealing a base section with an integral keyboard.

But the device can transform easily and quickly into a keyboard usage mode. FIG. 2 is a perspective view of the mobile device, showing the device transforming into its keyboard mode. The user simply manually slides the top section 1 relative to the base section 2. The top section 1, with integral touchscreen display 3, slides back over the base section 2 (with keyboard 4), moving parallel to the base section 2. In FIG. 2, the top section 1 is shown almost fully slid back, staying parallel to the base section 2 and revealing the integral keyboard 4 with full size keys.

Figure 3:
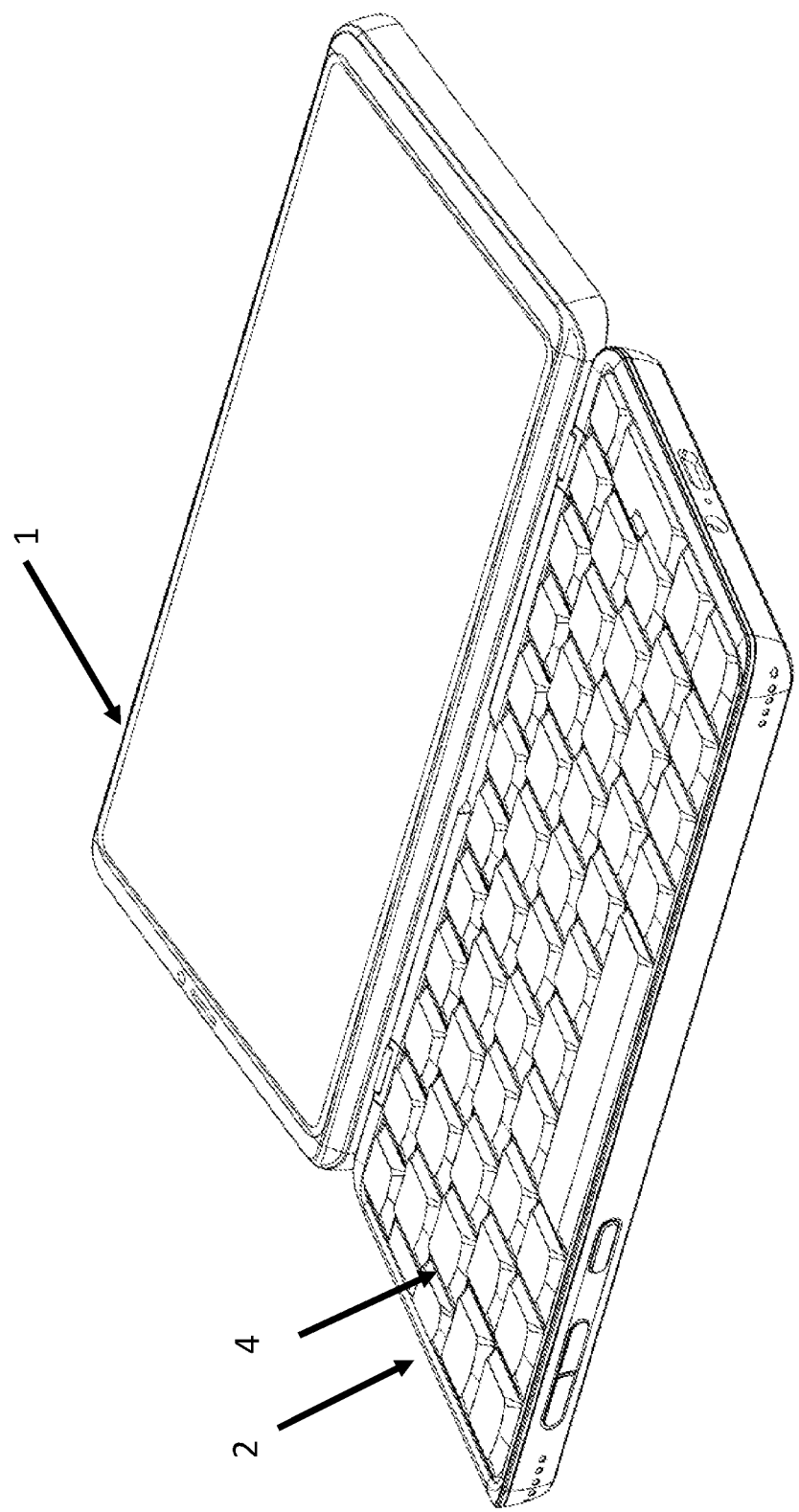
FIG. 3 a perspective view of the mobile device, showing the top section slid fully backwards to fully reveal the base section, giving full access to keyboard (or another touch screen); the device has now fully transformed from smartphone mode to keyboard or PC mode.

FIG. 3 a perspective view of the mobile device, showing the top section 1 slid fully backwards to fully reveal the top of the base section 2, exposing keyboard 4 (or another touch screen); the device has nearly completed transforming from smartphone mode to keyboard mode. The top section 1 has now moved fully behind the base section 2. As the top section 1 reaches the end of its travel, its front edge dips downwards behind the rear edge of the base section 2, and hence the top section 1 can pivot upwards.

Figure 4:
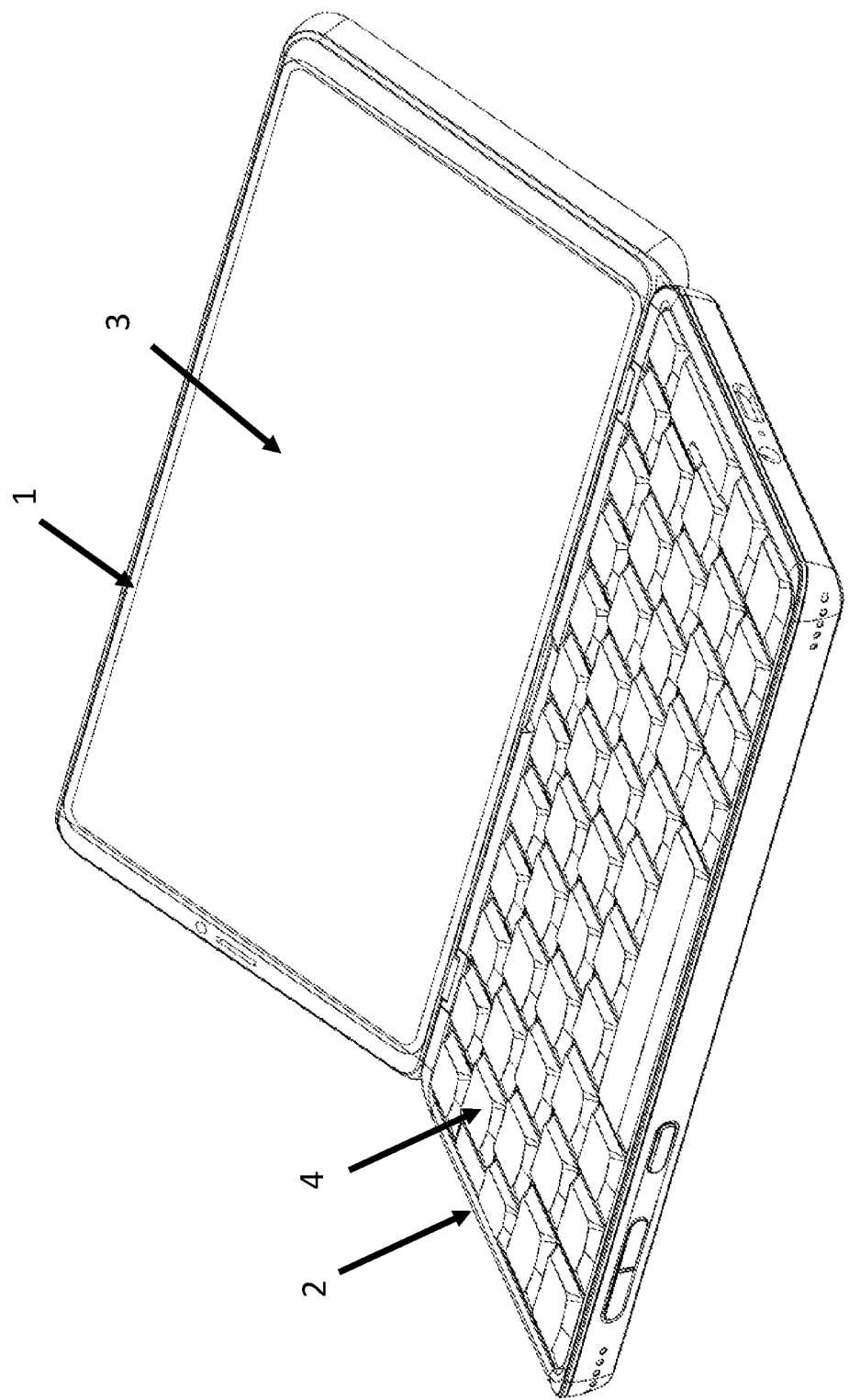
FIG. 4 a perspective view of the mobile device, showing the top section angled up to emulate an open laptop, with the base section keyboard fully exposed and available to the user.

FIG. 4 a perspective view of the mobile device, showing the top section 1 angled up to emulate an open laptop, with the base section keyboard 4 fully exposed and available to the user; the keys are sized to enable touch typing. The device has now fully transformed into a keyboard mode device, with the display 3 is at a normal viewing angle (in this case, about 32 degrees). To transform the device back to its smartphone mode, the user gently lifts up the top section 1 and slides it back over the base section 2.

Figure 5:
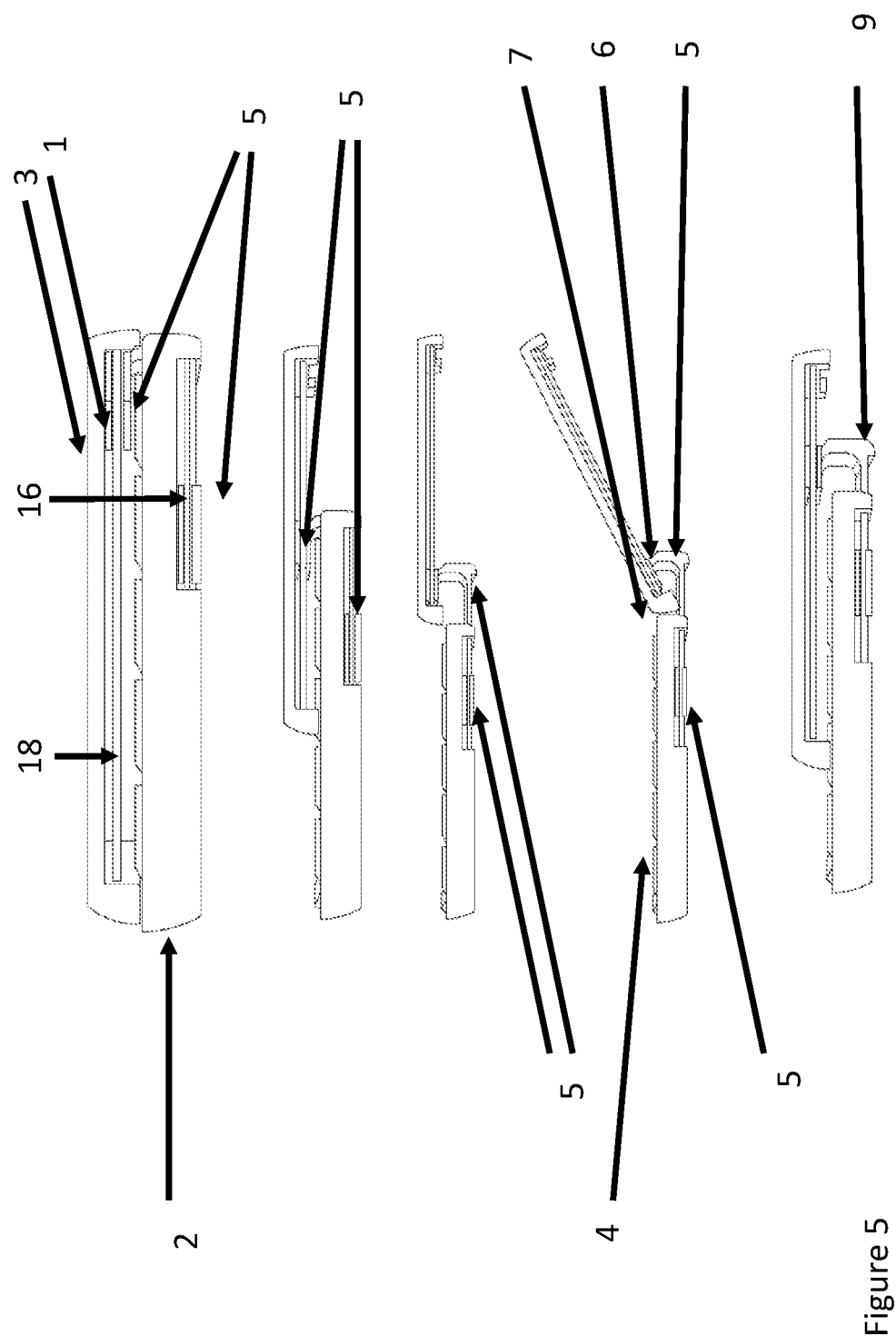
FIG. 5 are schematic side views of the mobile device (at varying scales), showing (top image) the device in smartphone mode; the second image down shows the top section partly slid backwards; the third image down shows the top section fully slid backwards; the fourth image down shows the device in keyboard or PC mode, with the top section pivoted upwards. The lowest image shows the device being transformed back into smartphone mode.

FIG. 5 are schematic side views of the mobile device, showing (in descending order) the device in smartphone mode; the top section 1 with touch screen display 3 sits fully over the base section 2. Top section 1 is connected to the base section not via a conventional clamshell hinge at its rear edge, but is instead connected using an L-shaped sliding carriage 5. Top section 1 can slide backwards and forwards along the top of the L of the L-shaped sliding carriage 5; Top section 1 can slide relative to the carriage 5 on rails 18 fixed into the top section 1. Base section 2 can slide backwards and forwards along the long horizontal of the L-shaped sliding carriage 5, along rails 16 fixed into the base section 2. Later figures will explain this in more detail.

In the second figure down, and noting that the images are not all to the same scale, top section 1 is partly slid backwards and has moved back along top rails 18. The sliding carriage 5 has however not moved relative to the base section at this time.

In the third figure down, top section 1 is fully slid backwards and the front edge 7 of top section 1 is right at the rear edge of the base section 2; top section 1 has slid virtually fully backwards along the top of the L of the L-shaped sliding carriage 5; the carriage 5 had previously remained static relative to the base section whilst the top section slid backwards, but once the top section 1 had completed its travel, then the long horizontal of the L-shaped sliding carriage 5 in the base section 2 also slides backwards, as shown in this image. Rear foot 9 of the carriage provides support and stability for the top section 1.

In the fourth figure down, the top section 1 has been slid fully backwards. The front edge 7 of top section 1 has dropped down behind the rear edge of the base section 2; the top section 1 has therefore pivoted and the device is in keyboard or PC mode, with the touch screen display 3 angled at a suitable angle (approximately 32 degrees) to the keyboard 4. This pivoting happens as the user manually pushes the top section fully to the rear, as the front edge of the top section is no longer supported and can hence drop down. In the final figure, the top section 1 has been closed onto the base section 2 and is moved back over the keyboard 4 to transform the device back to smartphone mode.

Figure 6:
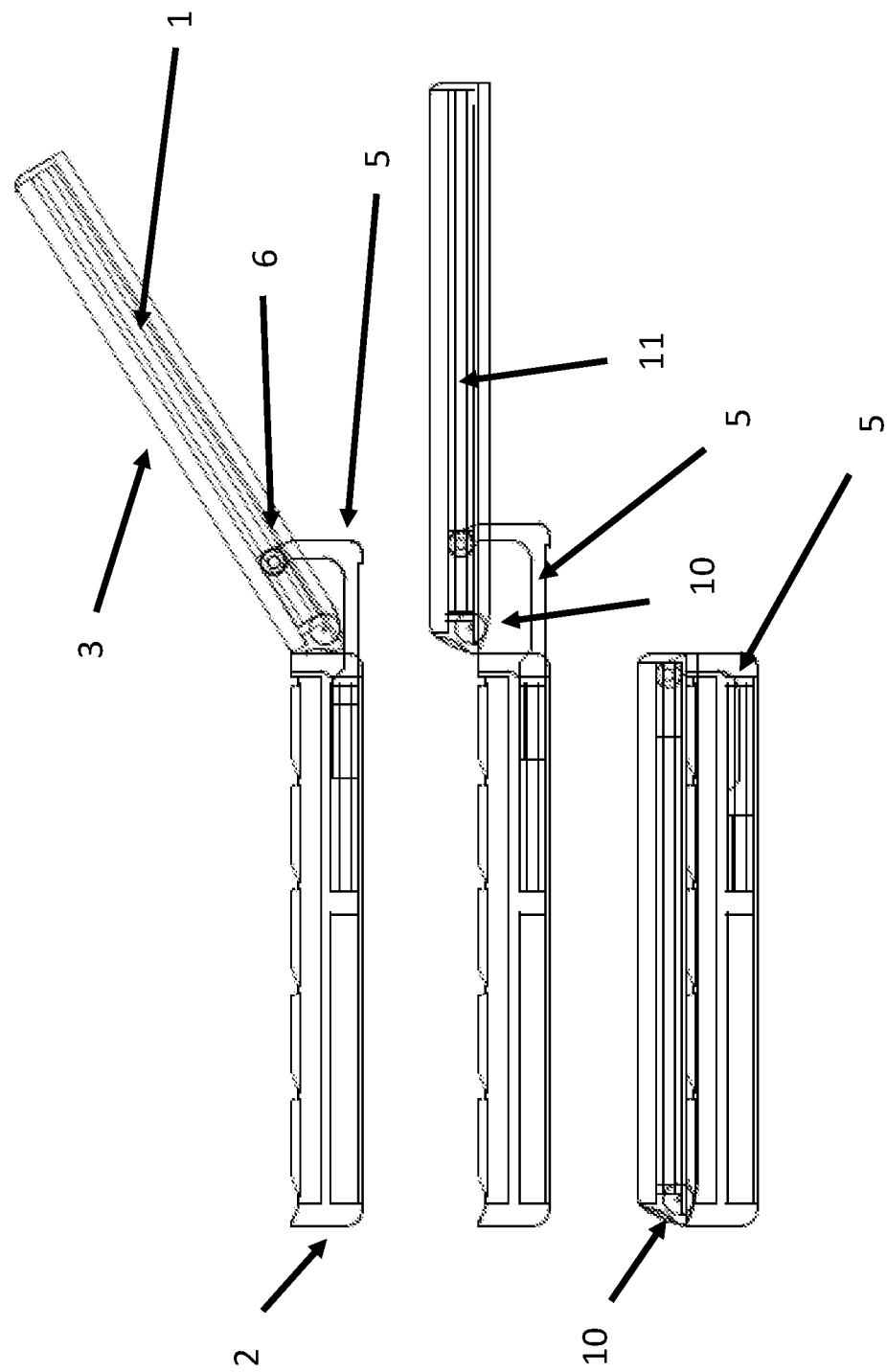
FIG. 6 are schematic views of the FIG. 5 mobile device, showing the sliding mechanism in profile.

FIG. 6 are schematic views of the FIG. 5 mobile device, showing the sliding mechanism in profile, this time starting (top image) in the fully open, keyboard mode position and progressing to the smartphone mode position (lowest image). A hinge 6 on the rear foot of the carriage connects the sliding carriage 5 to the top section 1. To transform the device to smartphone mode, the user gently pushes down on the top edge of the touch screen display 3, causing the top section 1 to pivot about hinge 6 until the top section 1 is horizontal (as shown in the middle figure). The top of the L of the L-shaped sliding carriage 5 includes a roller 10; roller 10 engages with a roller track 11 in the top section; this enables the top section to move backwards and forwards over the base section 2. The user pushes the top section 1 back over the base section 2; the top section moves, with roller 10 rolling in roller track 11. Towards the end of the travel of the top section, sliding carriage 5 is also engaged to move back into the base section 2. As the user continues to push the top section 1 back over the base section 2, the device fully transforms back to smartphone mode, as shown in the lowest figure.

Figure 7:
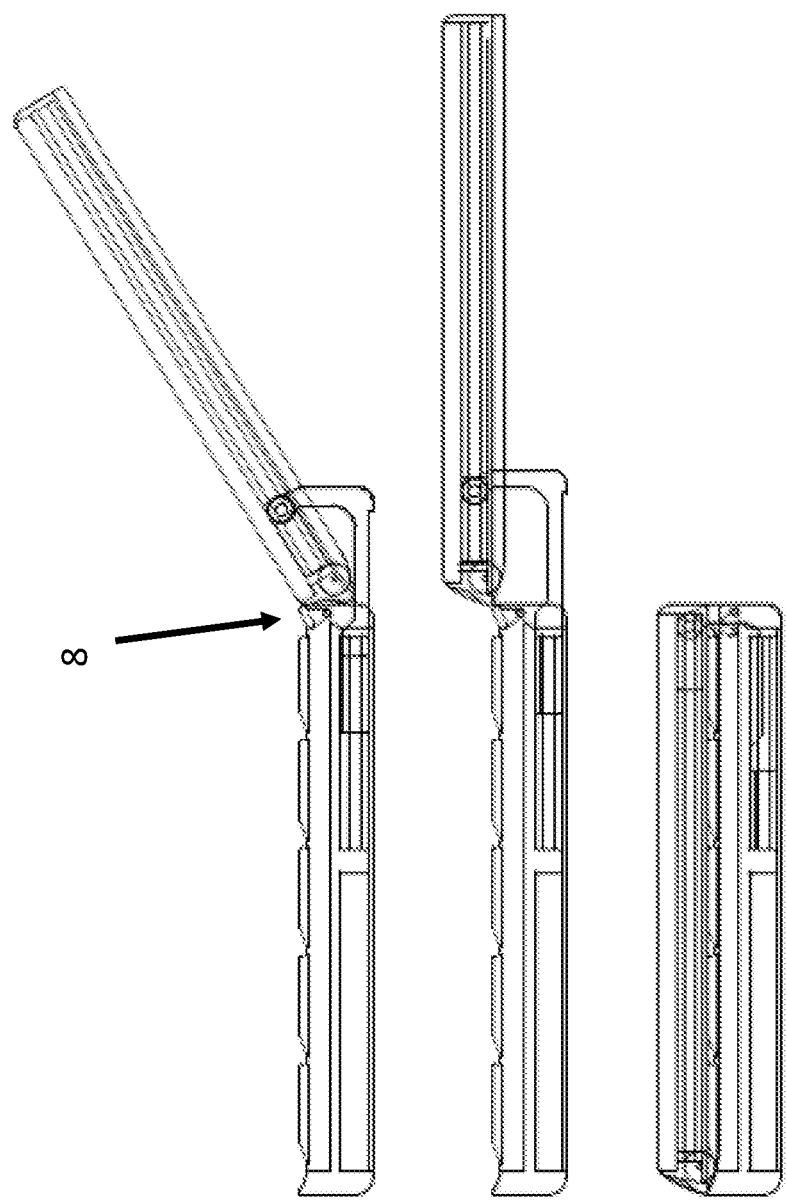
FIG. 7 are schematic views of the FIG. 5 mobile device, showing the sliding mechanism in profile, and including a hinged flap at the rear edge of the base section.

FIG. 7 are schematic views of the FIG. 5 mobile device, showing the sliding mechanism in profile, and including a hinged flap 8 at the rear edge of the base section 2.

Figure 8:
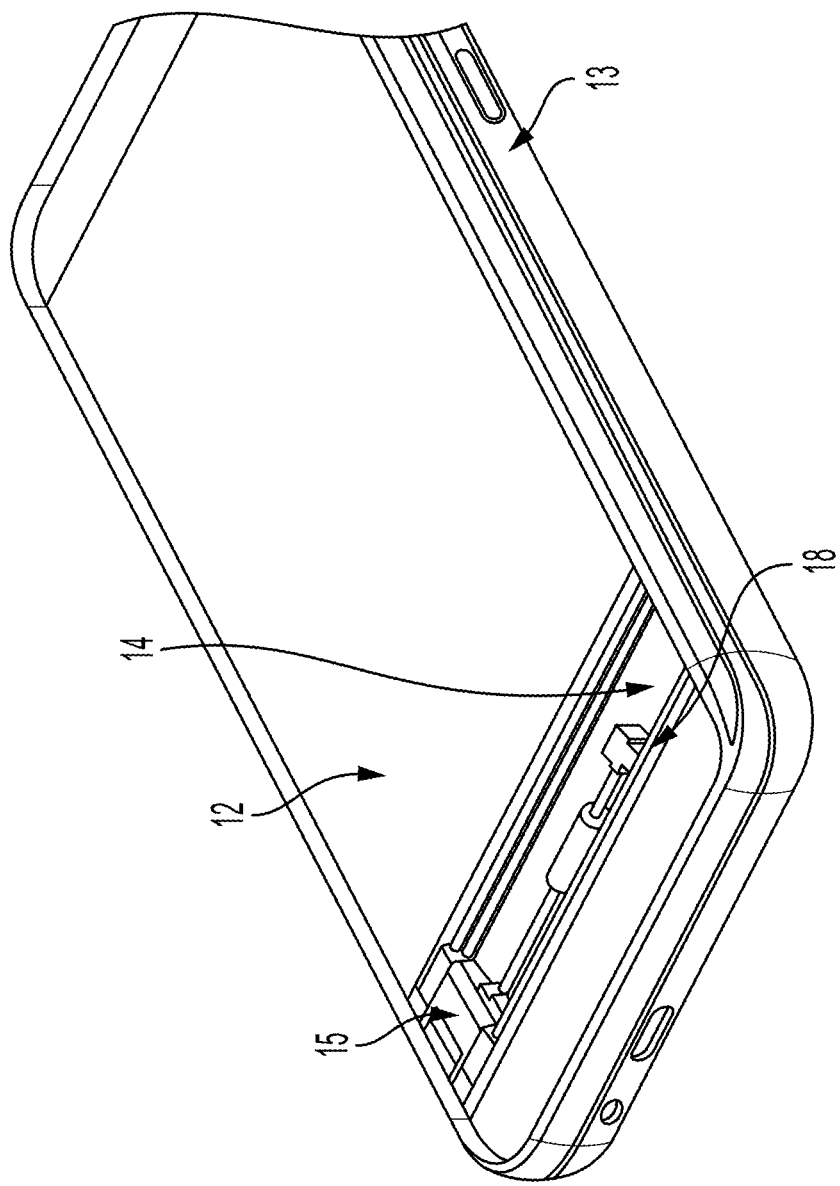
FIG. 8 shows the top and base section shells (i.e. the outer shell with no touchscreen display in the top section, including the sliding carriage mechanism, with the top section fully closed).

FIG. 8 shows the top section shell 12 (i.e. the outer shell with no touchscreen display in the top section 1). Top section shell 12 is fully over the base section shell 13. The top of the L-shaped sliding carriage 15 is visible. When the top section shell 12 is moved rearwards, then top of the L-shaped sliding carriage 15 slides along carriage rails 18 in the top section, moving along gap 14 in the top section shell 12. The left hand slider mechanism is shown; there is an identical mechanism on the right side, but it is not shown.

Figure 9:
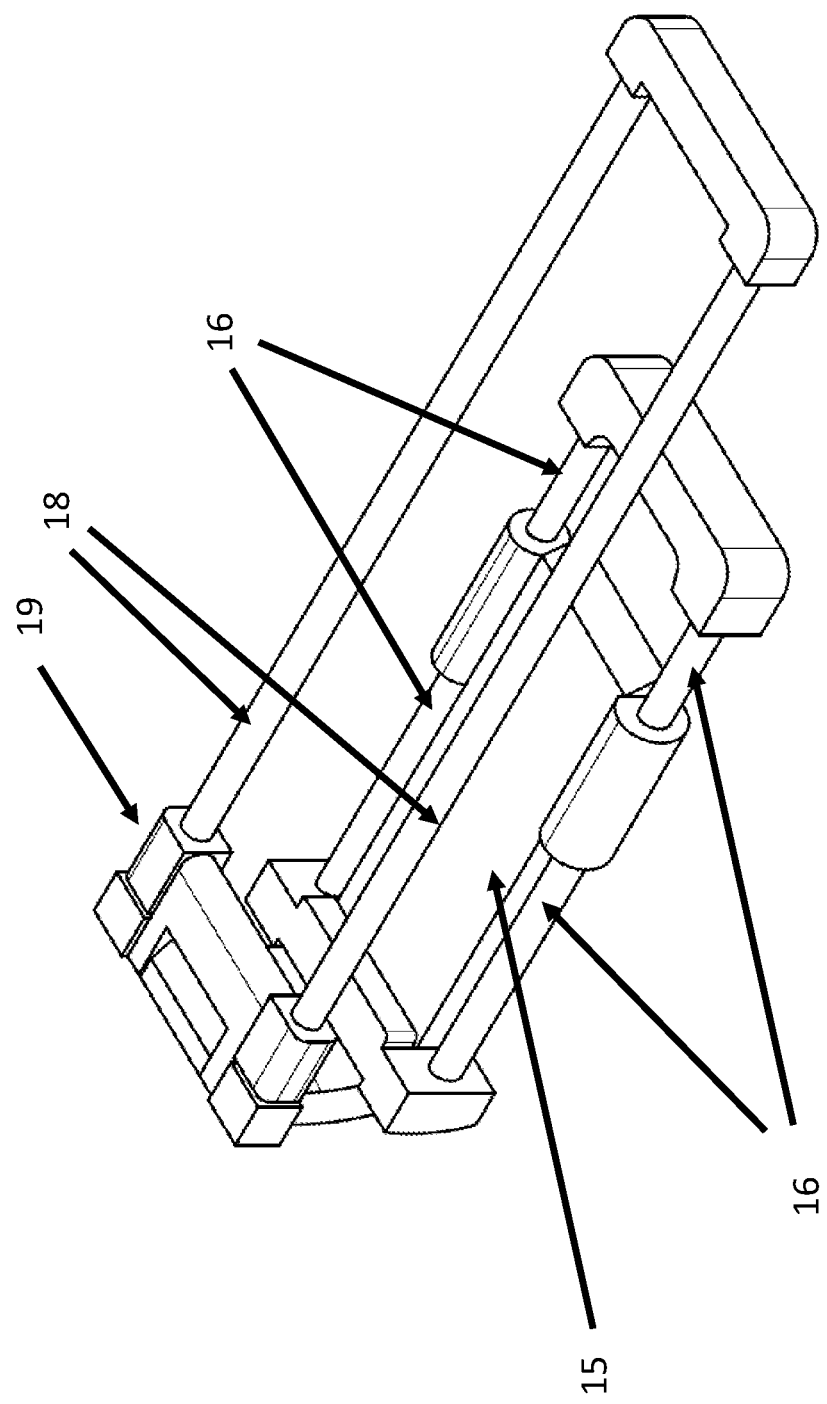
FIG. 9 shows the sliding carriage mechanism, with top and bottom rails; the mechanism is in the fully closed or smartphone mode position, as shown in FIG. 8.

FIG. 9 shows the L-shaped sliding carriage 15, together with the carriage rails 16 that are fixed in the base section and also the carriage rails 18 that are fixed in the top section. The mechanism is in the fully closed or smartphone mode position, as shown in FIG. 8. The carriage base can slide backwards and forwards along the bottom rails; the top rails can slide backwards and forwards through guide holes in the carriage top 19, moving the top section along with it. The sequence, as the top section moves backwards, is that, as the user manually pushes the top section rearwards relative to the base section, the top rails 18 slide rearwards through guide holes 19 in the carriage top until the top section reaches the end of its travel; the sliding carriage remains static relative to the base section during this movement because a spring (not shown) or other tensioning device biases the sliding carriage towards the front edge of the base section. As the user continues to apply rearwards pressure on the top section, overcoming the bias force of the spring, the L-shaped sliding carriage 15 slides backwards along the bottom rails 16, located in the base section, until the sliding carriage 15 reaches the end of the bottom rails 16. At that point, top section has moved fully rearwards, past the rear edge of the base section 2. There are identical sliding carriage mechanisms on the left and the right side of the device.

Figure 10:
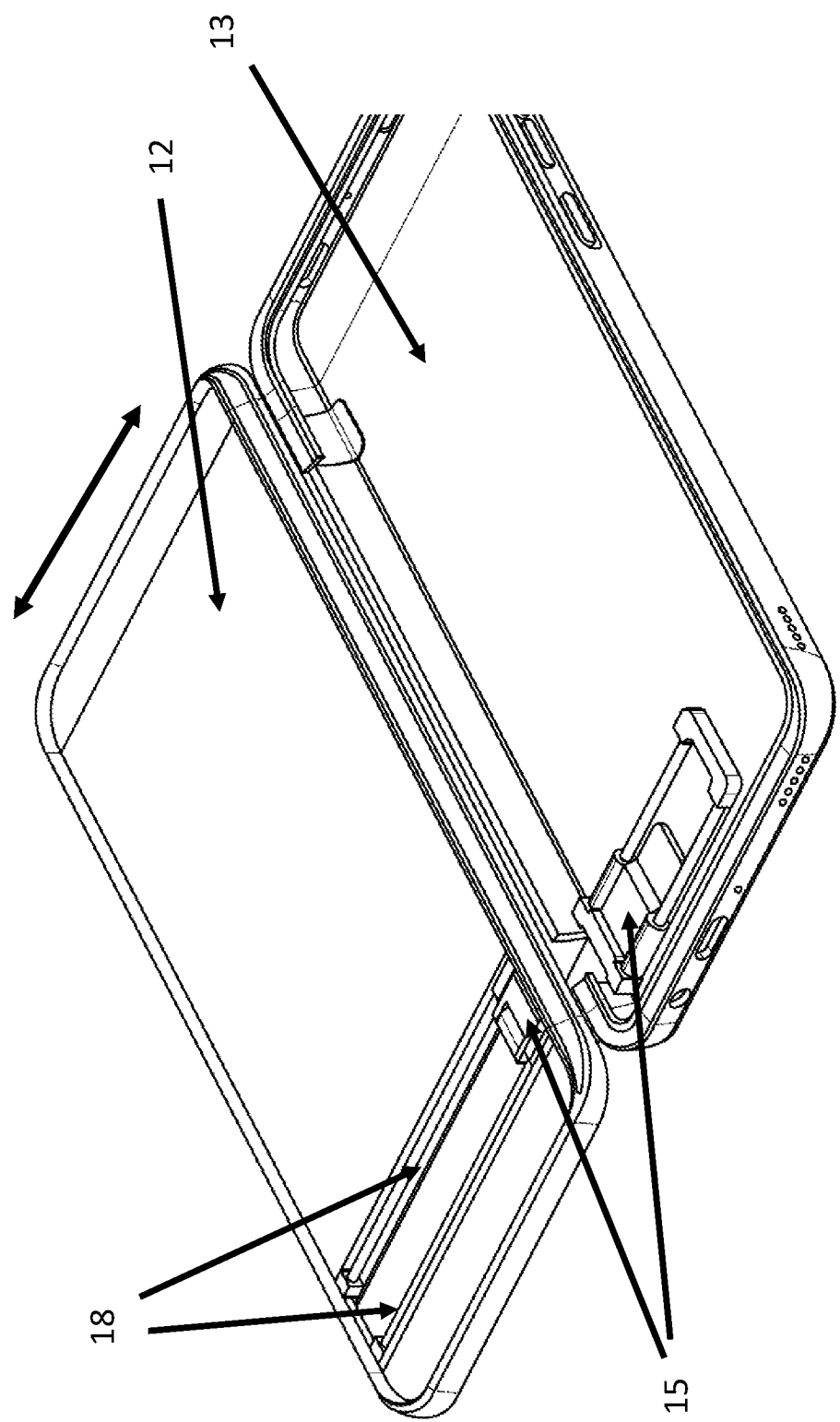
FIG. 10 shows the top and base section shells, showing the sliding carriage mechanism, with the top fully slid backwards, and still flat.

FIG. 10 shows the top section shell 12 and the base section shell 13. The top section shell 12 has moved fully rearwards, past the rear edge of the base section shell 13, sliding along the carriage rails 18 that have themselves slid along the top of the L-shaped sliding carriage 15. In addition, the sliding carriage 15 has moved to the back of the carriage rails 16 in base section shell 13.

Figure 11:
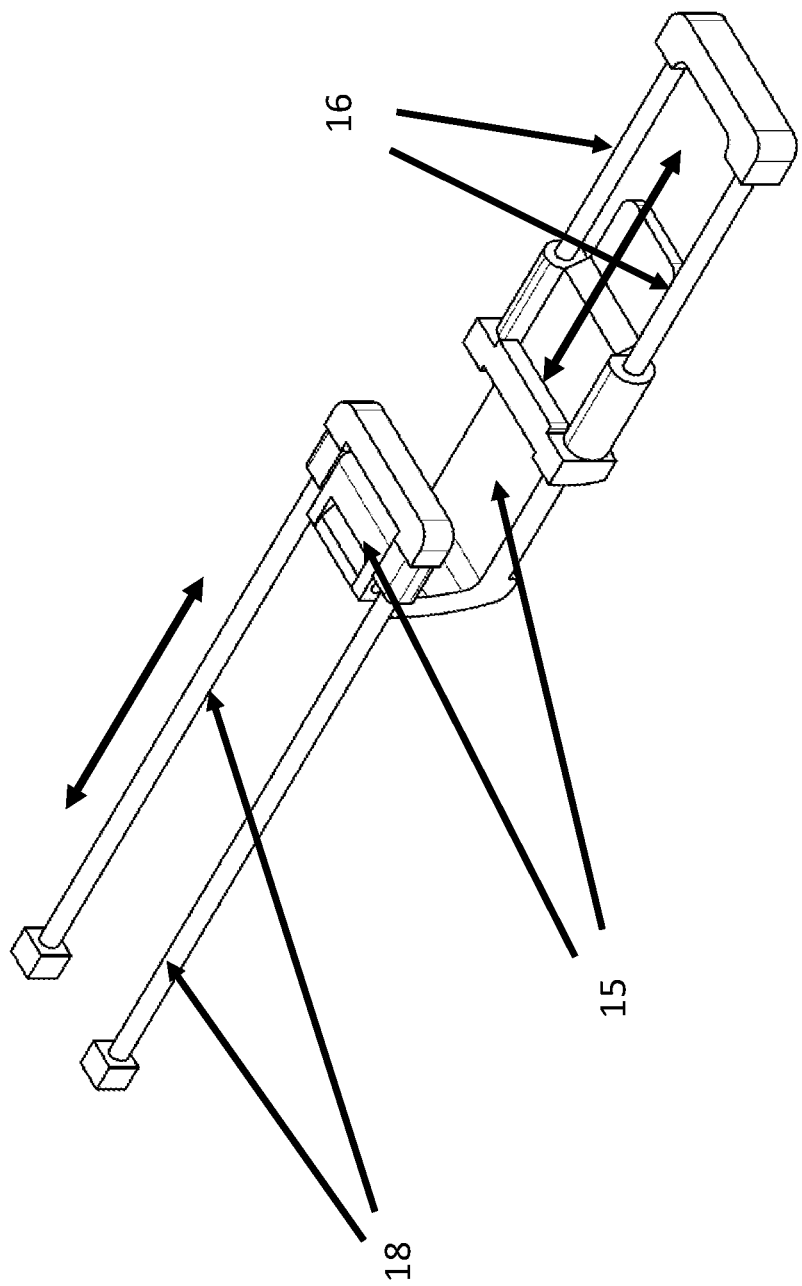
FIG. 11 shows the sliding carriage mechanism, with top and bottom rails; the top rails (and hence top section) are in the furthest rearward position, as shown in FIG. 10; the carriage has also now slid fully back along the rails in the base section.

FIG. 11 shows the sliding carriage 15, with top section carriage rails 18 and base section carriage rails 16; the top section carriage rails 18 (and hence the top section) are in the furthest rearward position, as shown in FIG. 10; the carriage 15 has also now slid fully back along the base section rails 16, as shown in FIG. 10.

Figure 12:
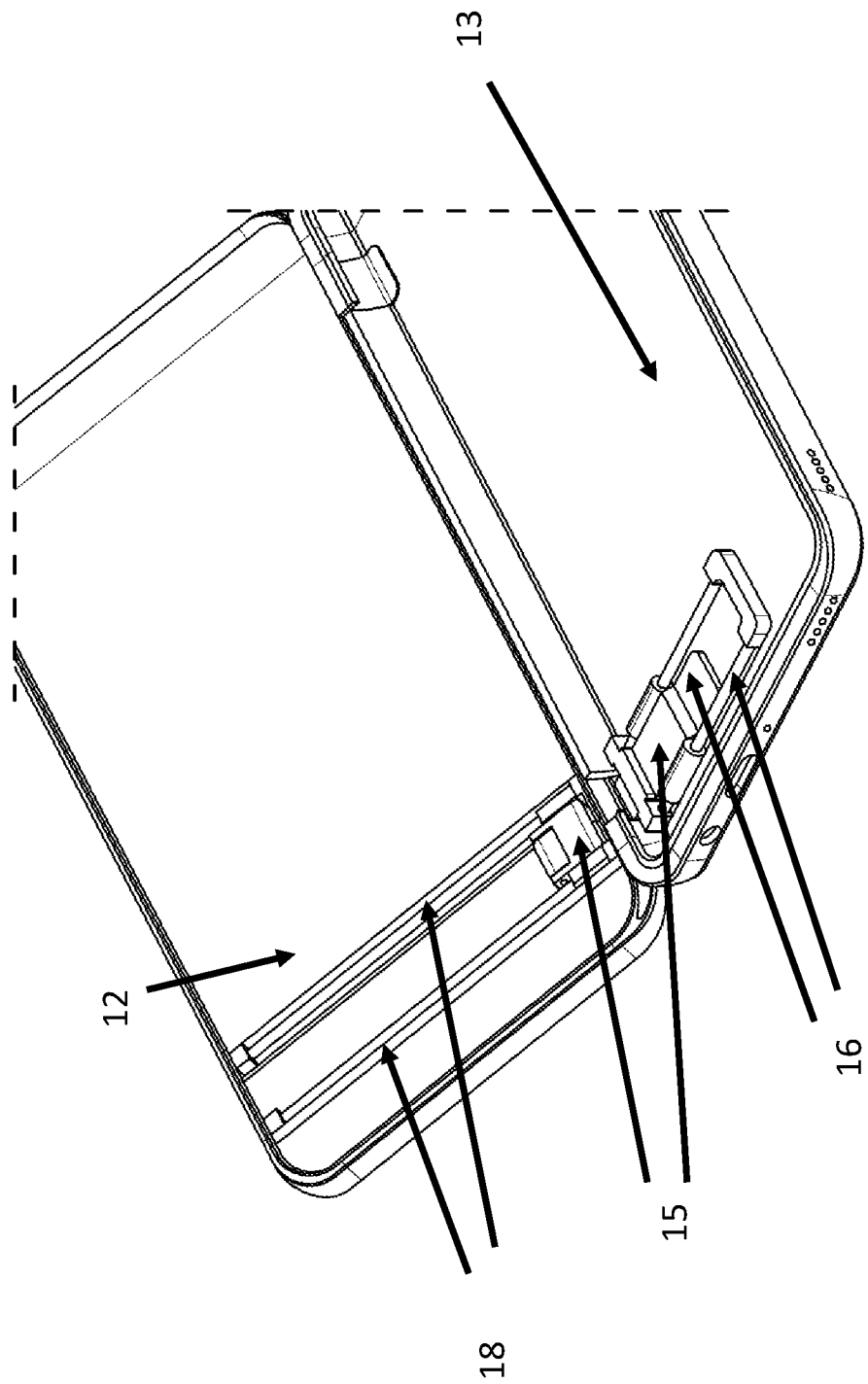
FIG. 12 shows the top and base section shells, showing the sliding carriage mechanism, with the top fully open and angled for reading.

FIG. 12 shows the top section shell 12 and the base section shell 13, showing the sliding carriage mechanism 15, with the top fully open and angled for reading.

Figure 13:
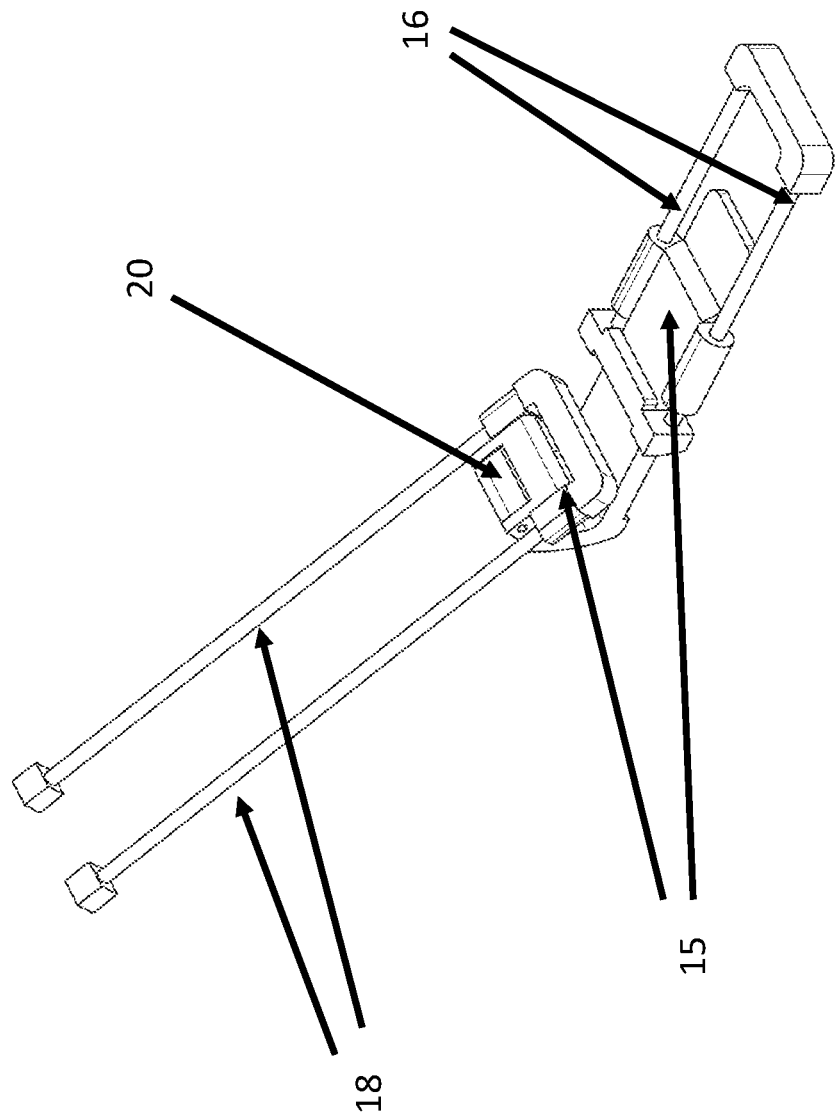
FIG. 13 shows the sliding carriage mechanism, fully open, with the top in the angled position; the top section rails are pivoted upwards, supporting the screen in the top section at a suitable reading angle.

FIG. 13 shows the sliding carriage mechanism of FIG. 12 on its own, fully open, with the top in the angled position; the top section rails are pivoted upwards, supporting the screen in the top section at a suitable reading angle; as noted for FIG. 5, the top section rails can pivot through approximately 32 degrees about horizontal hinge 20 at the top of the L-shaped sliding carriage 15, because the front, lower edge of the top section is no longer supported and can hence drop behind the rear edge of the base section.

Figure 14:
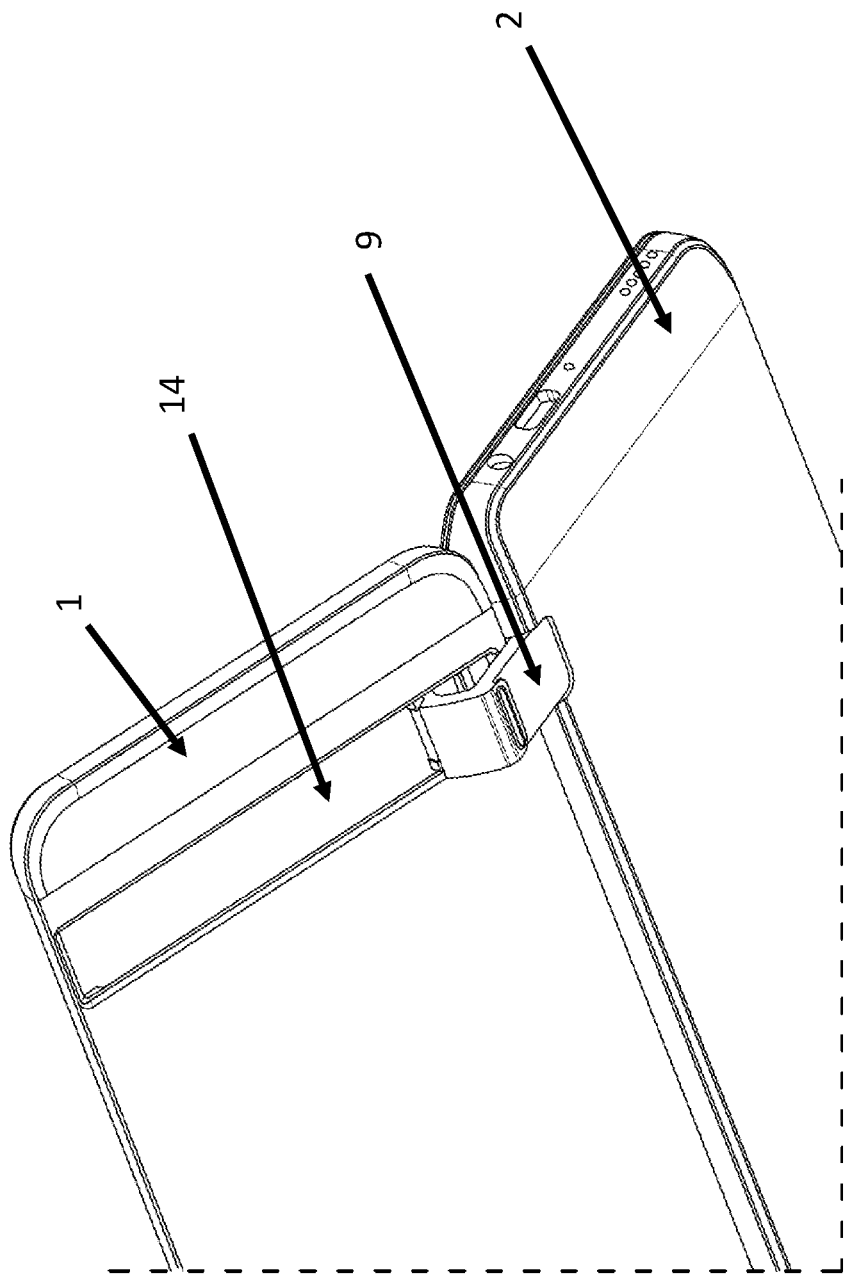
FIG. 14 shows the top section sitting fully behind the base section, and the rear stabilising foot that forms the rear of the carriage, extending from the rear of the base section; the device is in keyboard mode.

FIG. 14 shows the top section 1 sitting fully behind the base section 2. The rear stabilising foot 9 that forms the rear of the carriage, extends from the rear of the base section; the device is in keyboard mode. The gap 14 in top section 1 for the sliding carriage to move along is shown.

Figure 15:
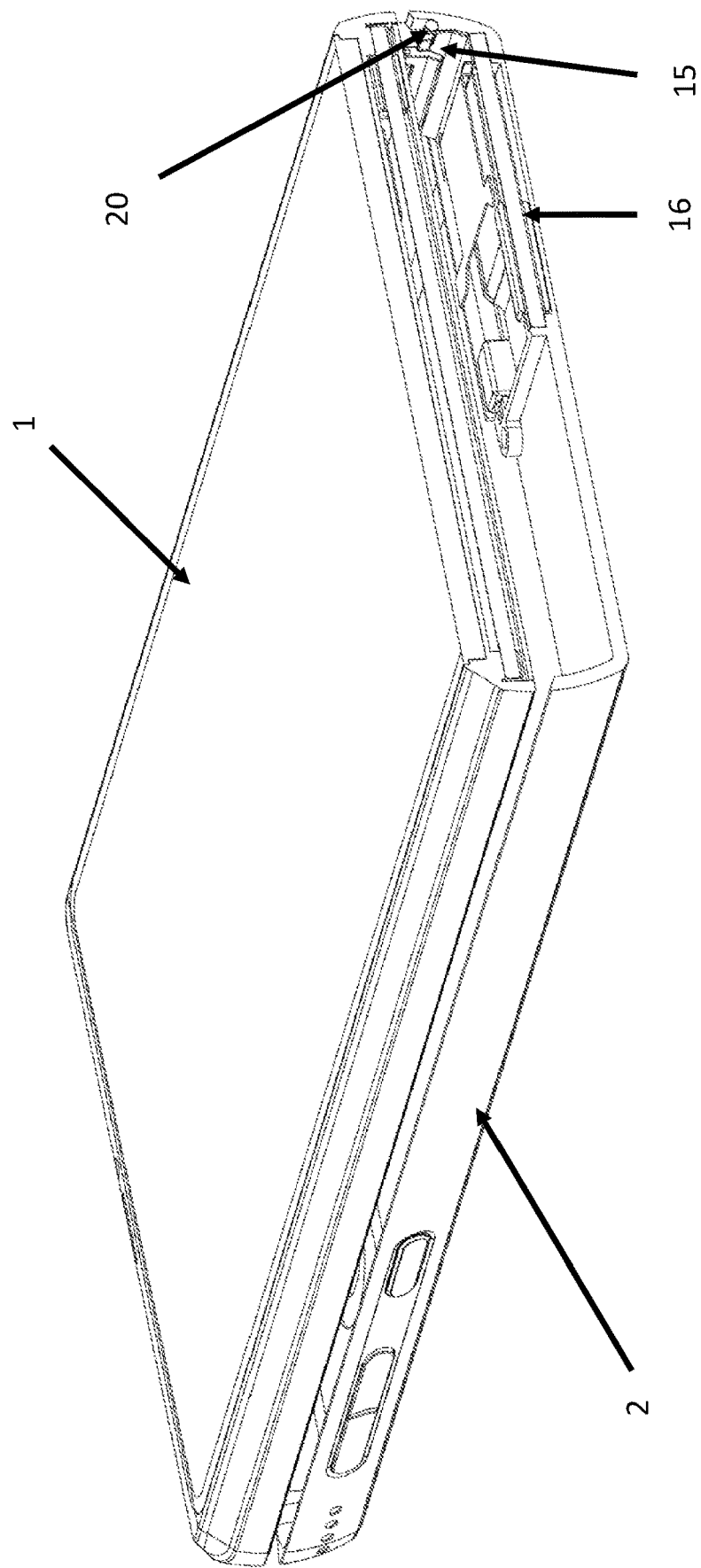
FIG. 15 is a perspective view of the device, in smartphone mode, with the top section sitting wholly over the base section; the device is cross-sectioned through the middle of the right hand carriage rail in the bottom section.
Figure 16:
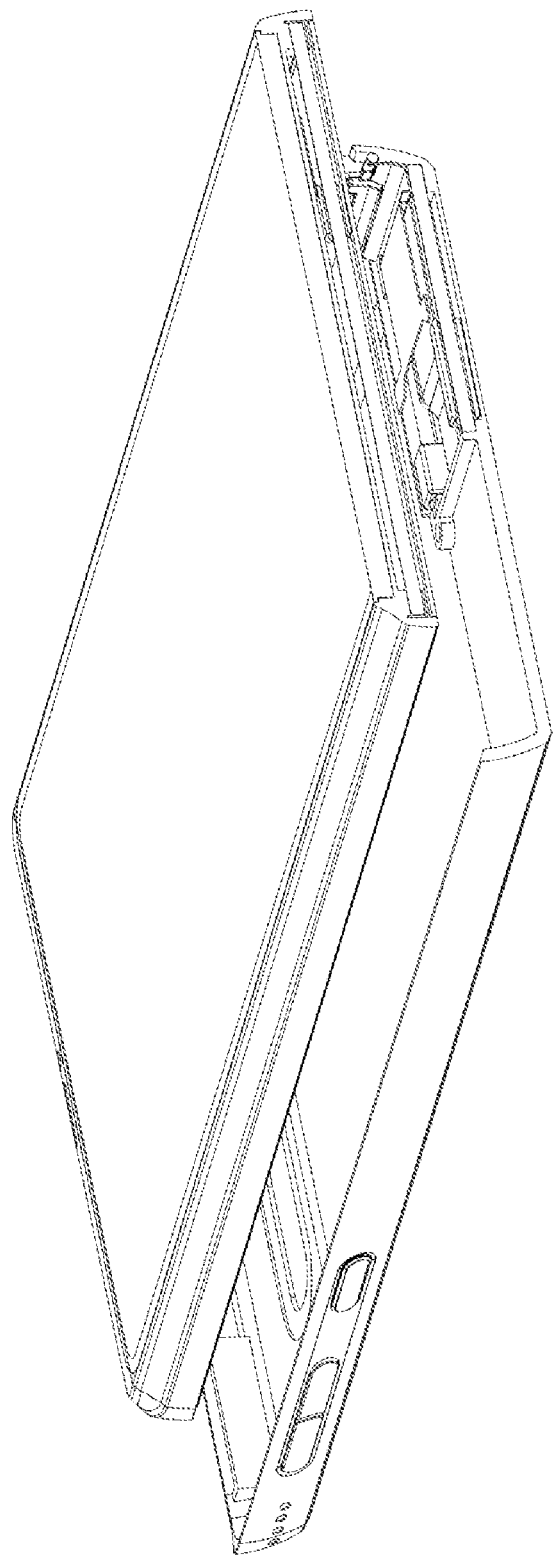
FIGS. 16-20 take the device shown in FIG. 15 and show the top section being progressively moved backwards until the display screen tilts upwards.
Figure 17:
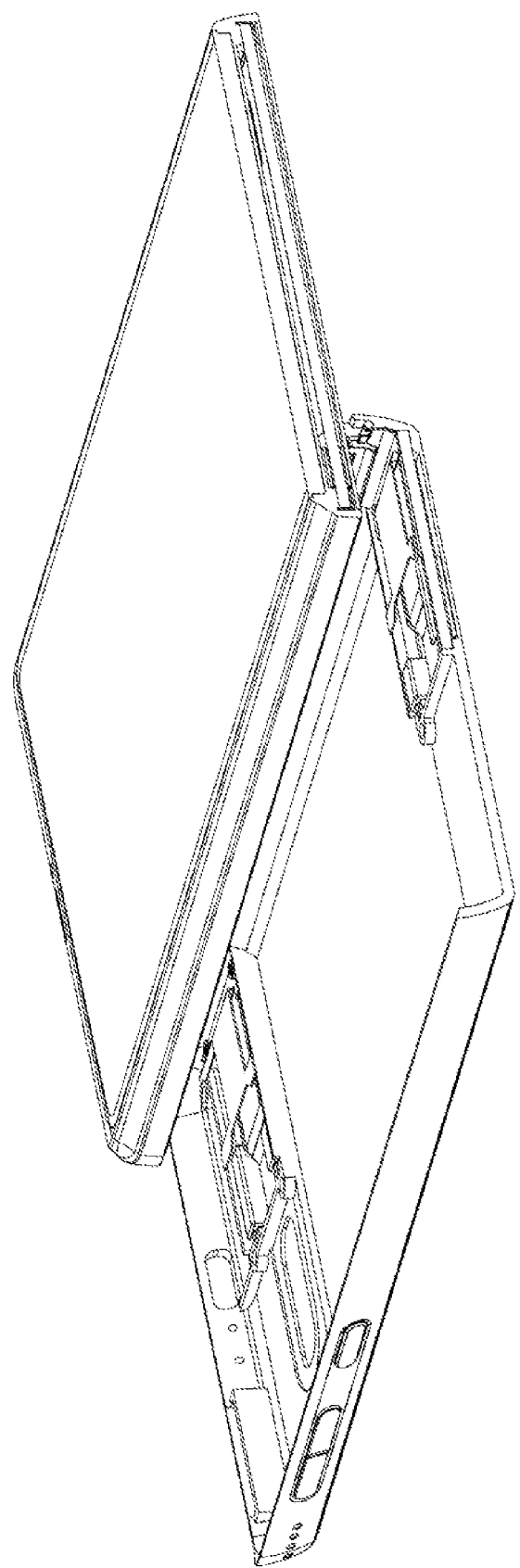
Figure 18:
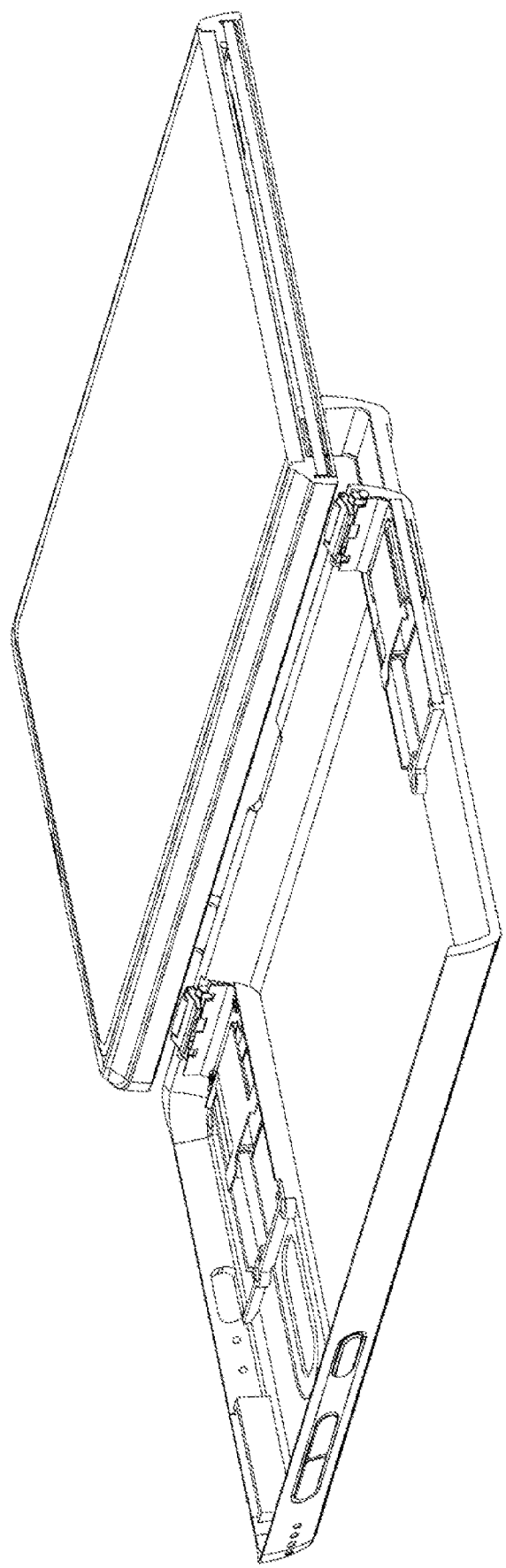
Figure 19:
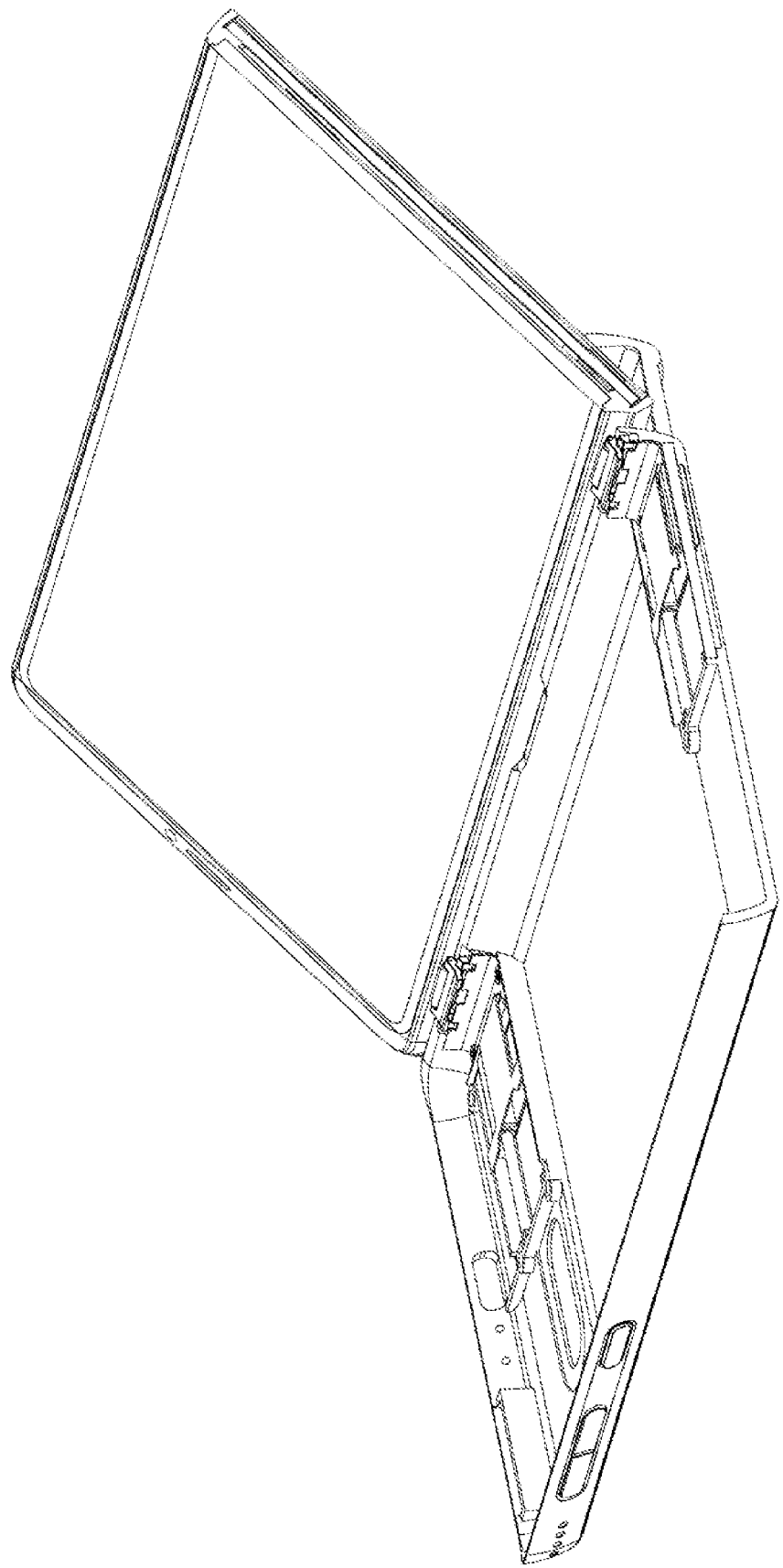
Figure 20:
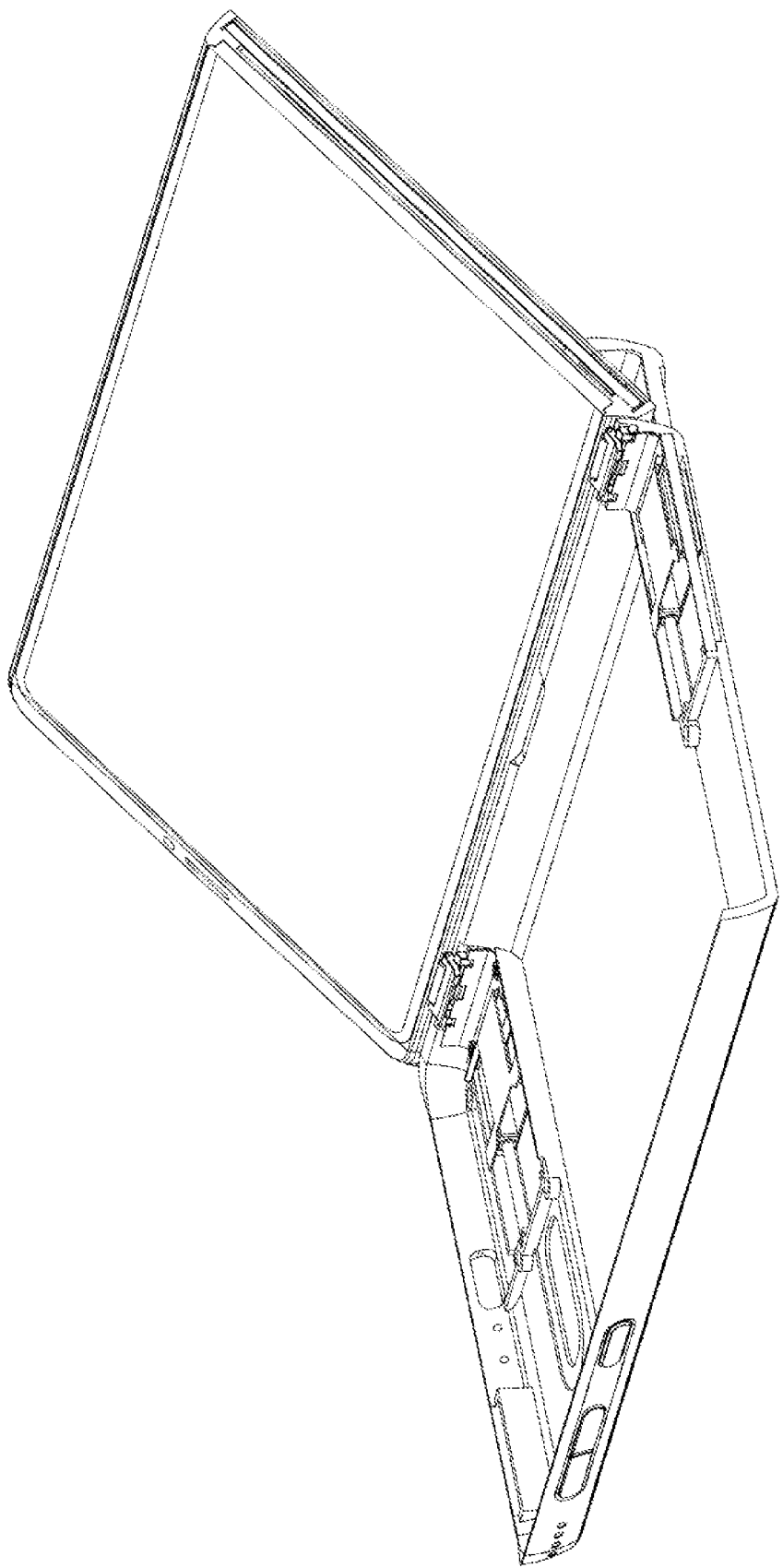
Figure 21:
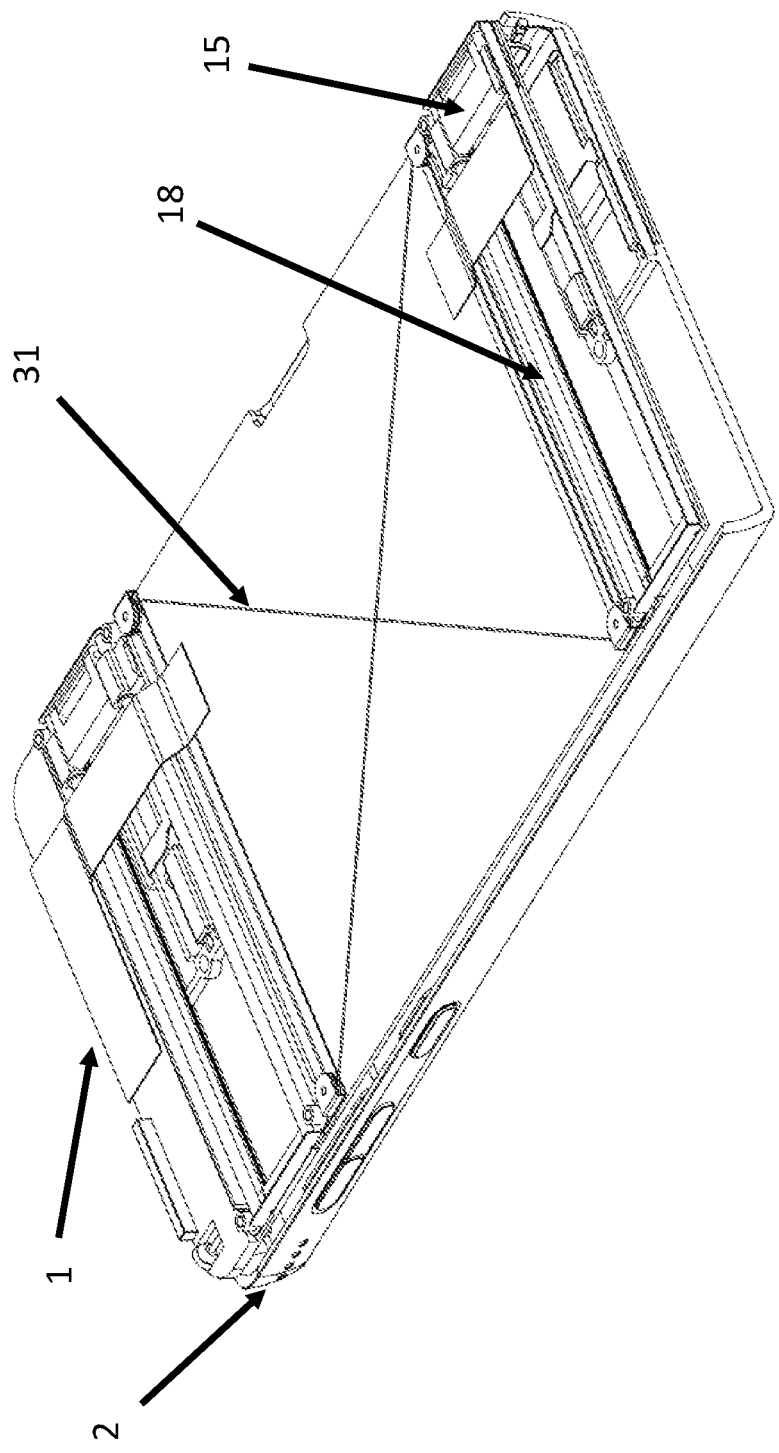
FIG. 21-26 take the FIG. 15-20 sequence, and show the device, but without the touch screen in position, so that the movement of the top section rails sliding back can be seen clearly.
Figure 22:
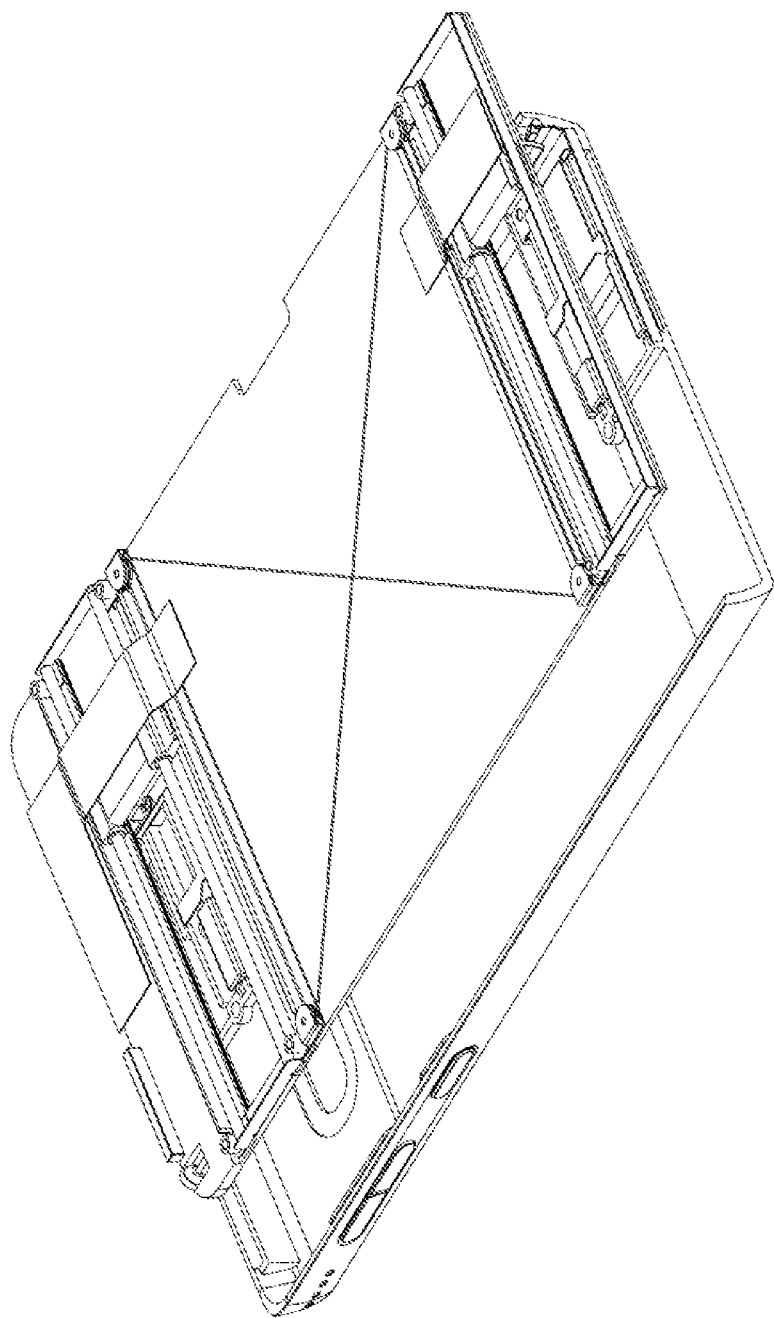
Figure 23:
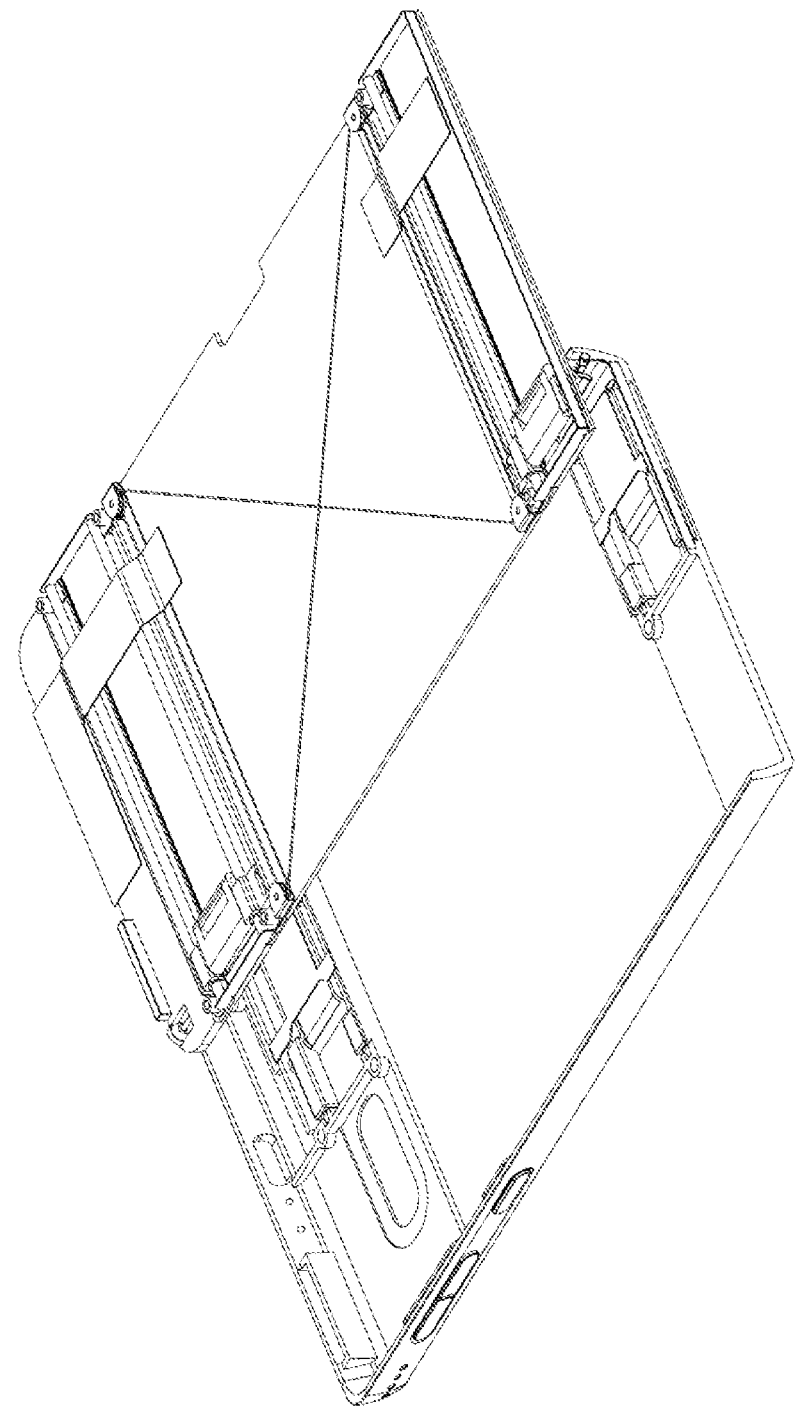

FIG. 15 is a perspective view of the device, in smartphone mode, with the top section 1 sitting wholly over the base section 2; the device is cross-sectioned through the middle of the right hand carriage rail 16 in the base section 2. Sliding carriage 15 is therefore cross-sectioned and horizontal hinge 20 is visible.

FIGS. 16-20 take the device shown in FIG. 15 and show the top section being progressively moved backwards until the display screen tilts upwards and drops down behind the rear edge of the base section 2.

Figure 24:
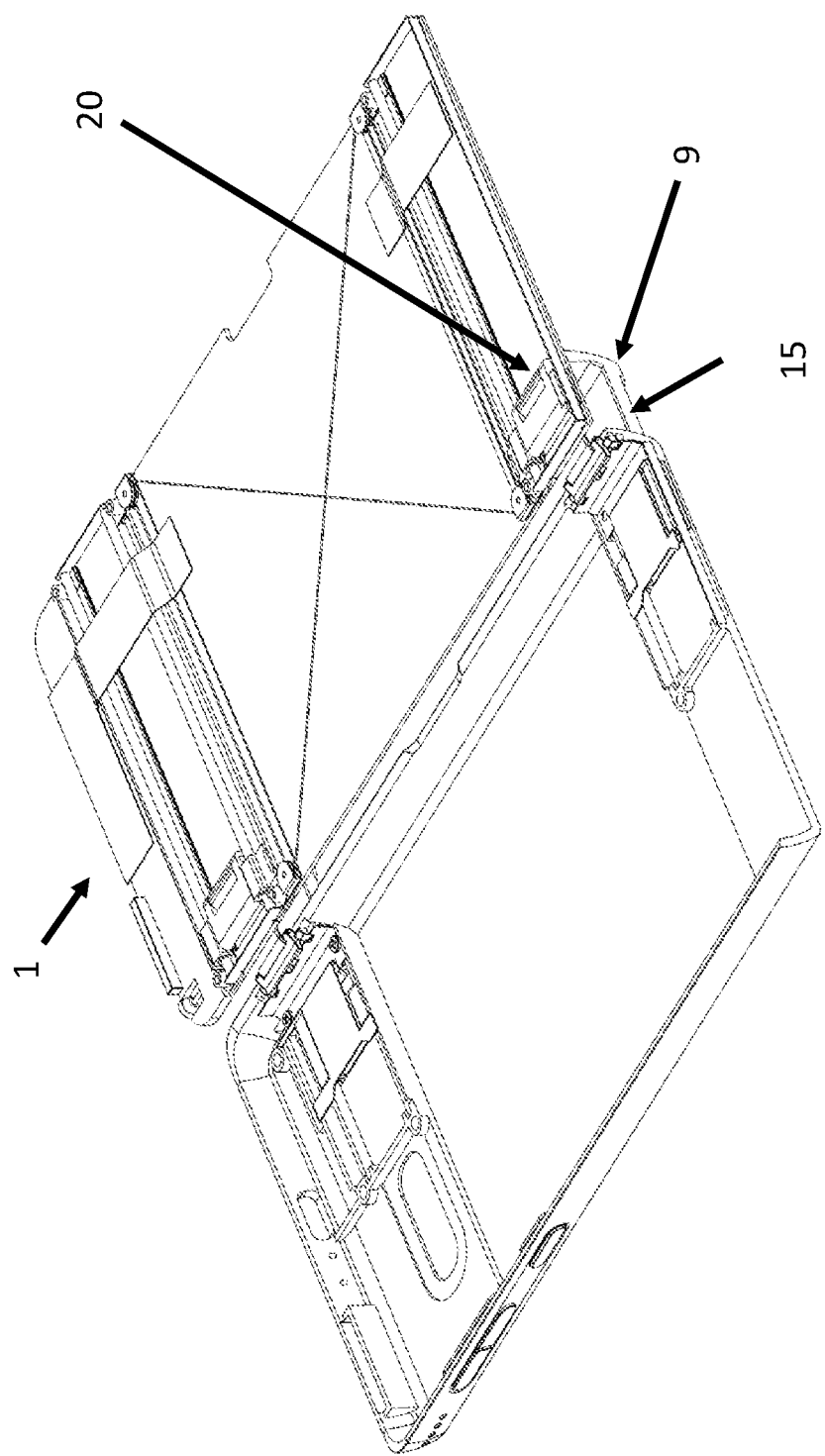
Figure 25:
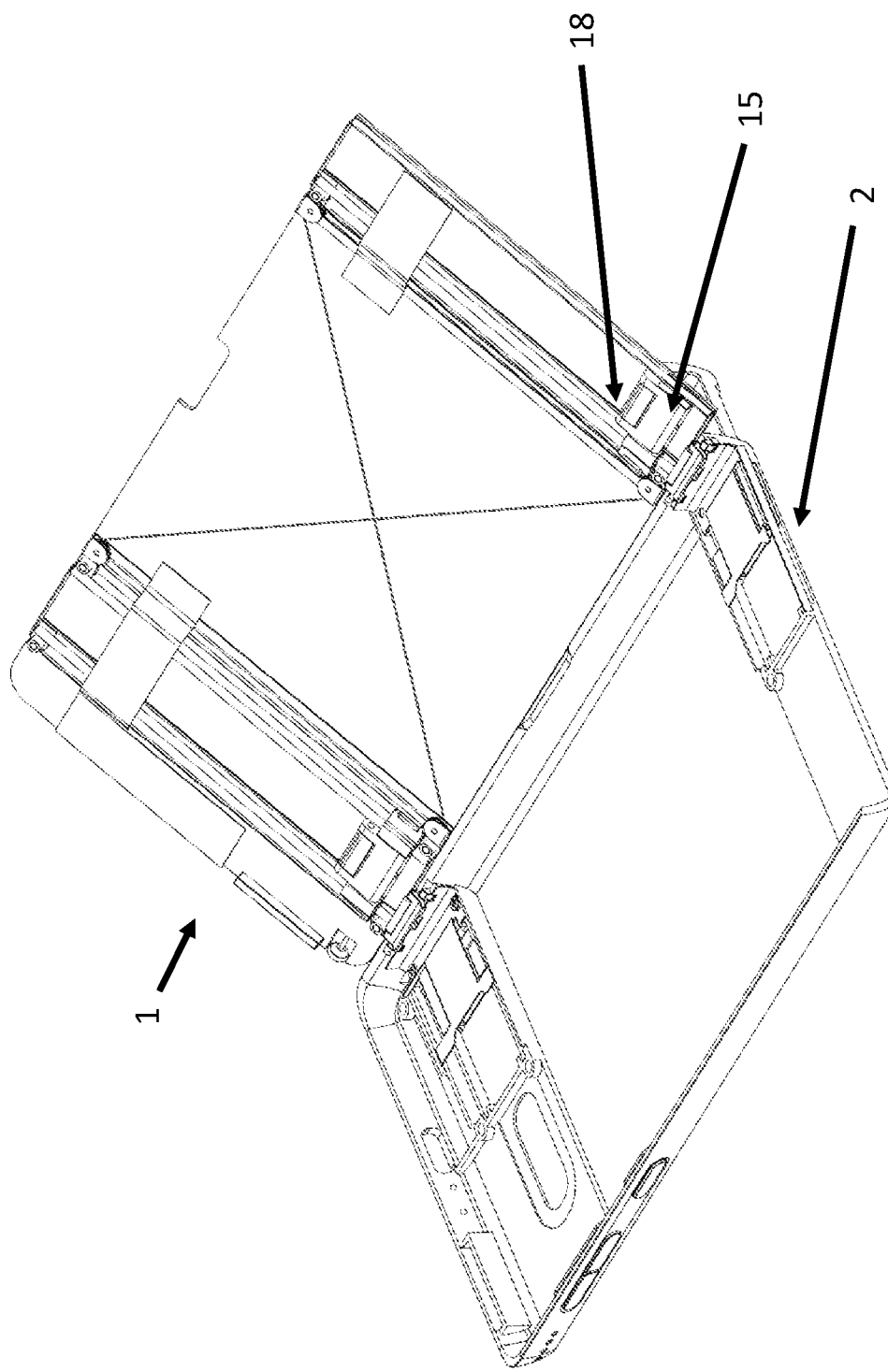
Figure 26:
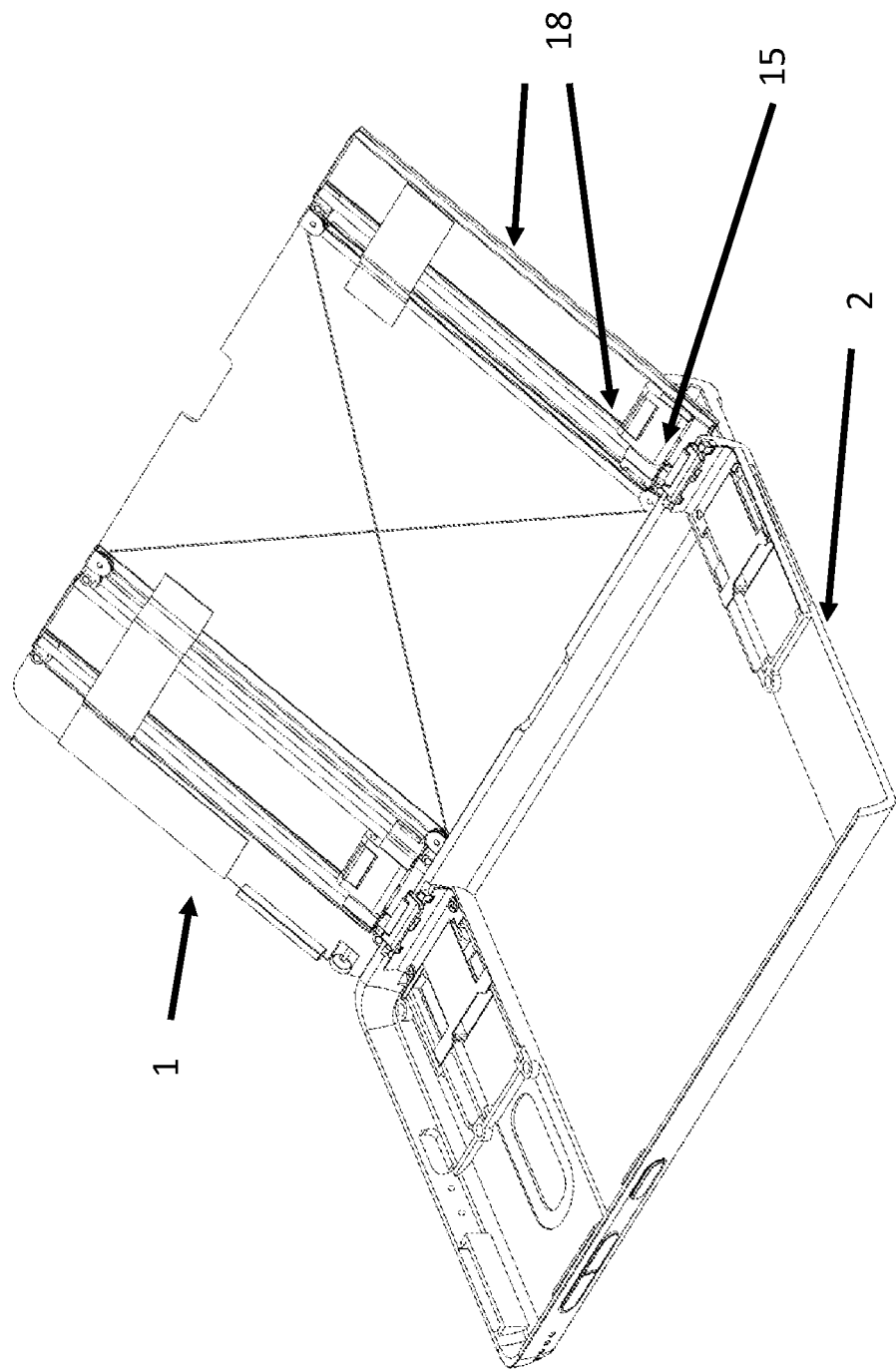
Figure 27:
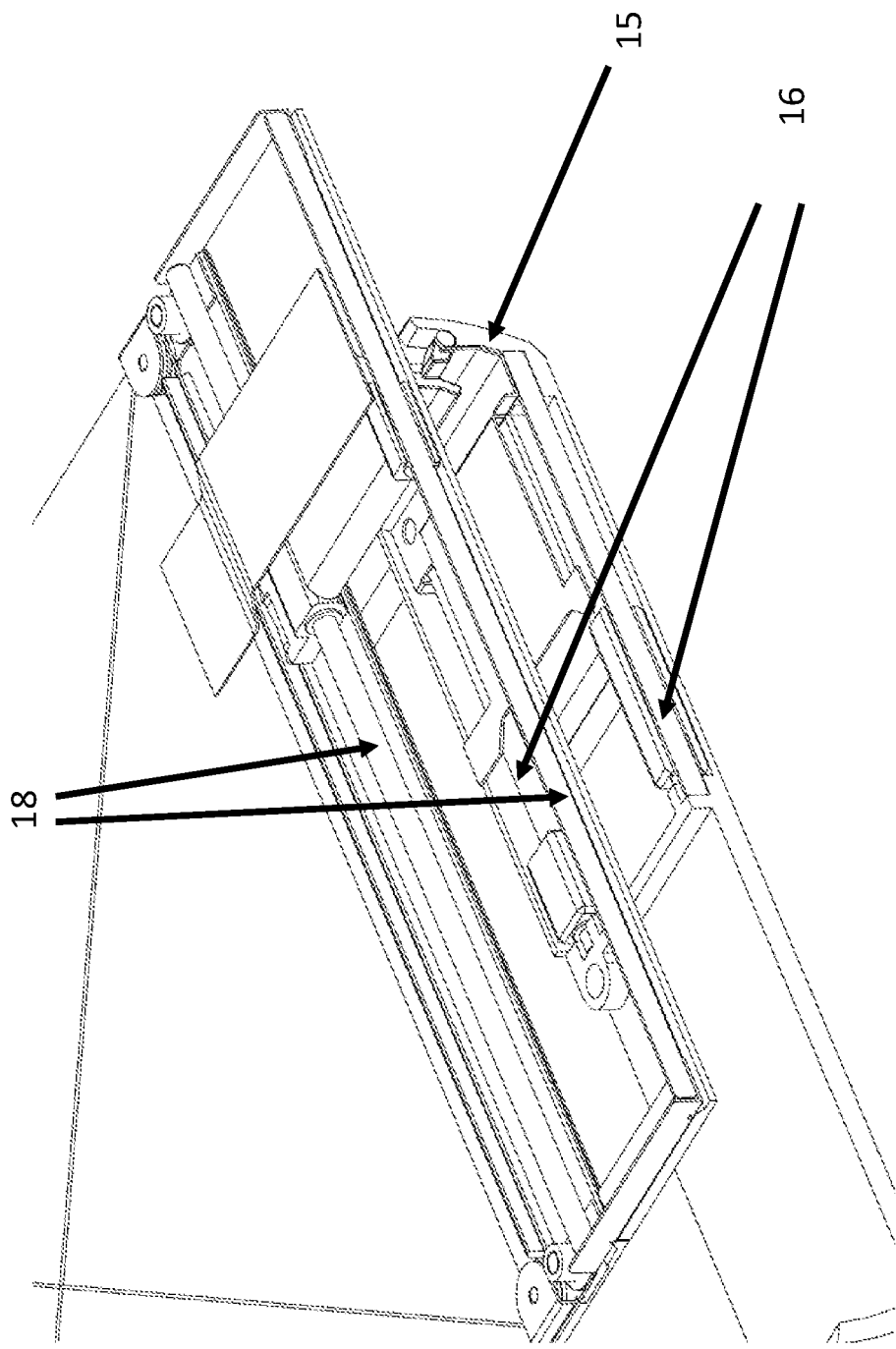
FIG. 27-31 take the FIG. 21-26 sequence, and give an enlarged view of the carriage and the top and bottom rails.
Figure 28:
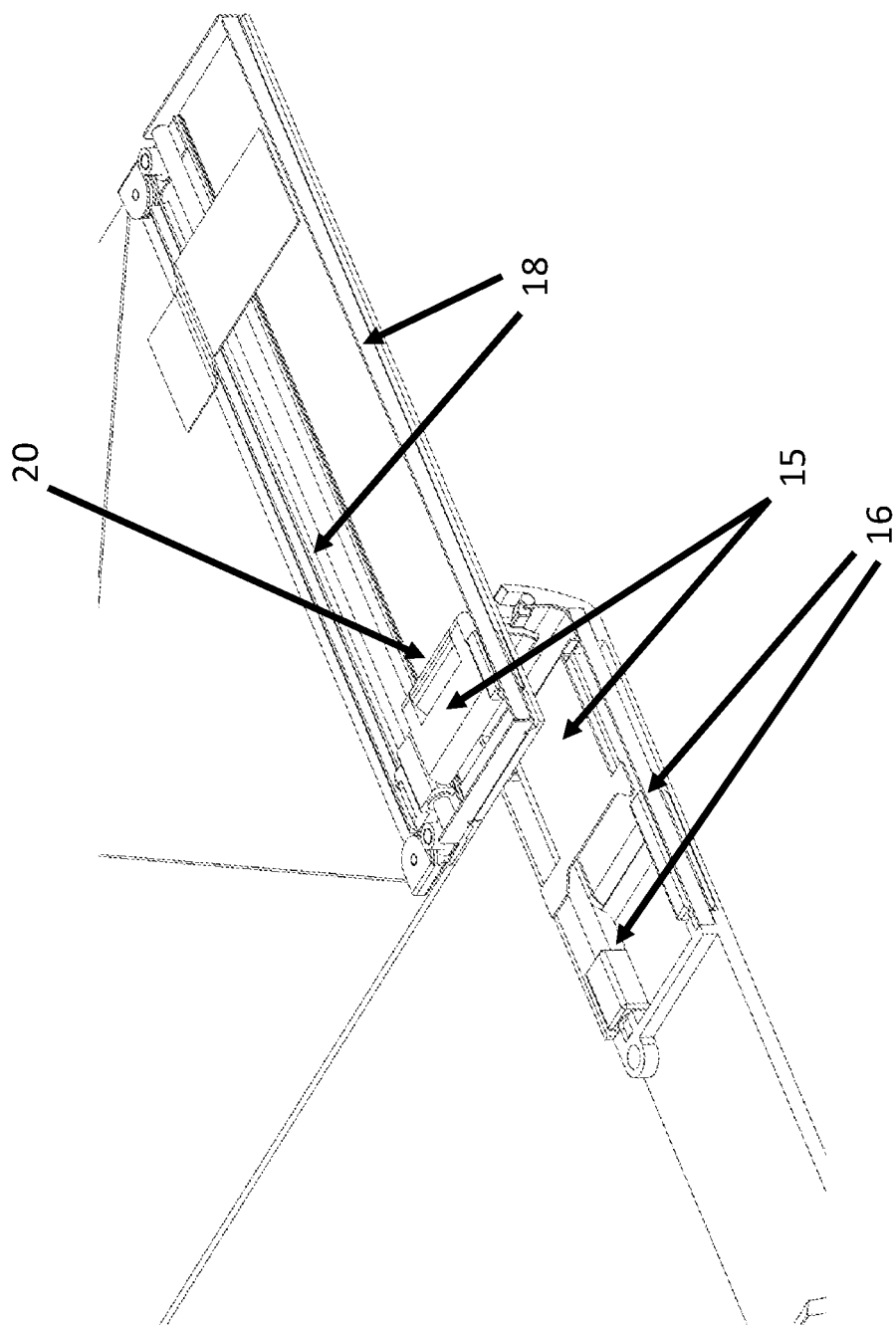
Figure 29:
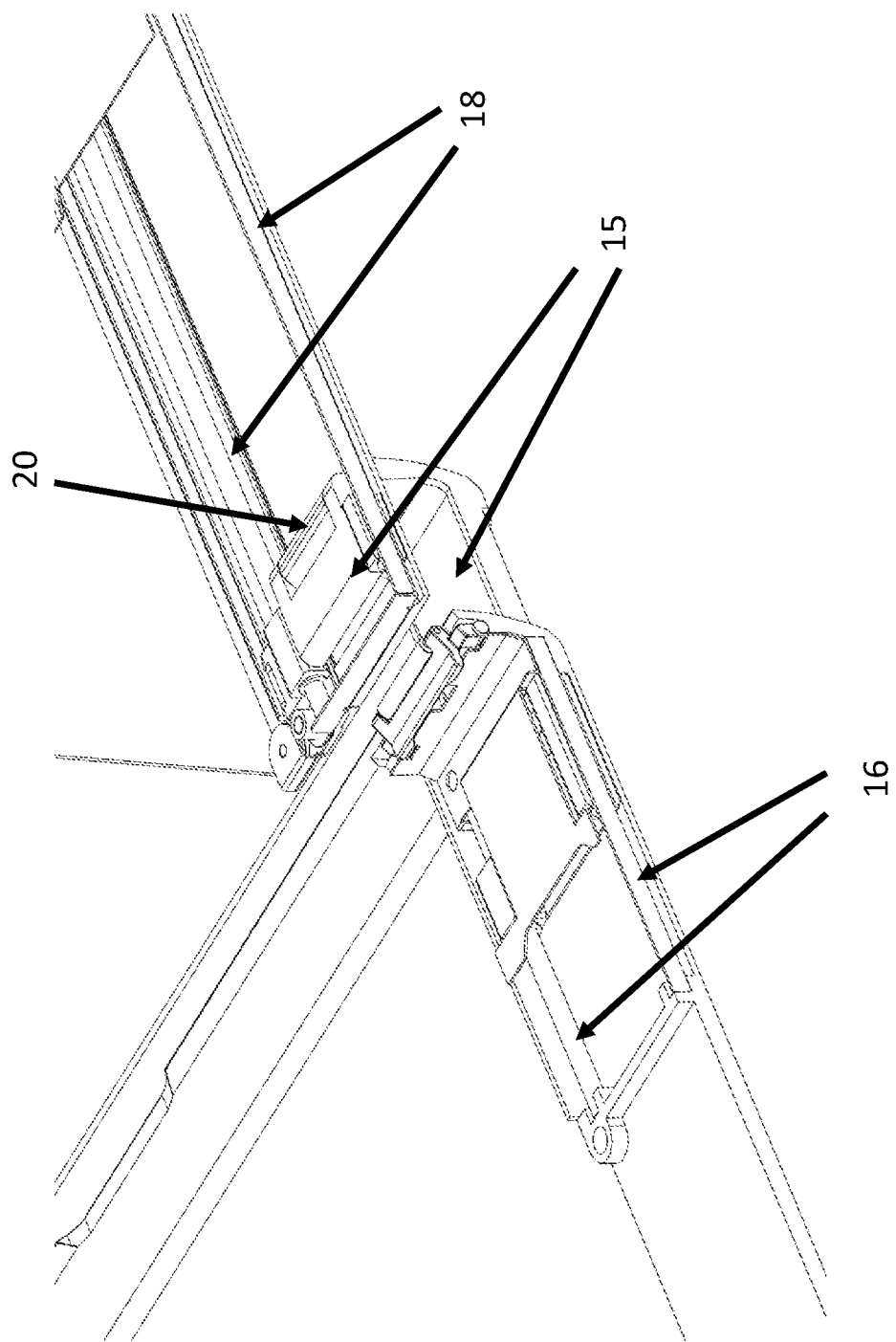
Figure 30:
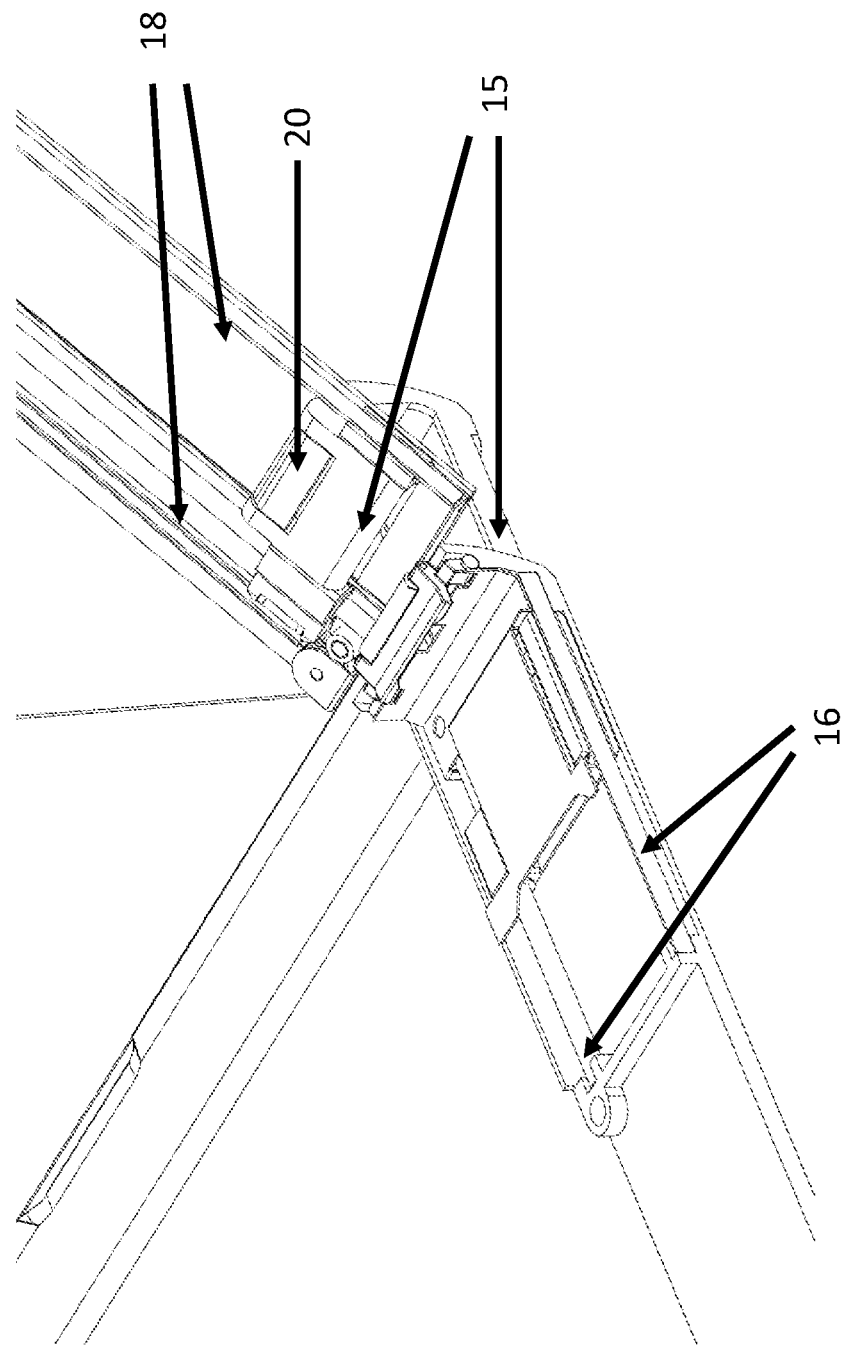

FIG. 21-26 take the FIG. 15-20 sequence, and show the device, but without the touch screen in position, so that the movement of the top section rails sliding back can be seen clearly. A tensioned cable 31 ensures that the top section 1 remains parallel to the base section 2 when being moved backwards and forwards. Looking at FIG. 21, we can see the carriage rails 18 in top section and the top of the L-shaped sliding carriage 15 that engages with these carriage rails 18. As the top section 1 is slid backwards, the top of the L-shaped sliding carriage 15 slides along the carriage rails 18 in the top section until it reaches the end of its travel—see FIG. 23. Note that the sliding carriage 15 has not itself moved rearwards within the base section 2 at this point and the top section still lies over a part of the base section. The final rearwards movement is shown in FIG. 24, where the sliding carriage 15 has now itself moved rearwards within the base section 2 and the rear supporting foot 9 fully protrudes from the base section. At this point, the top section is now free to pivot around horizontal hinge 20 that enables the carriage rails in the top section to pivot through approximately 32 degrees as the device transforms from smartphone mode to keyboard mode, as shown in FIG. 25. The final movement is for top section 1 to drop down slightly, again sliding on top rails 18, so that its front edge can rest firmly against the rear edge of the base section 2 and the sliding carriage 15, as shown in FIG. 26.

Figure 31:
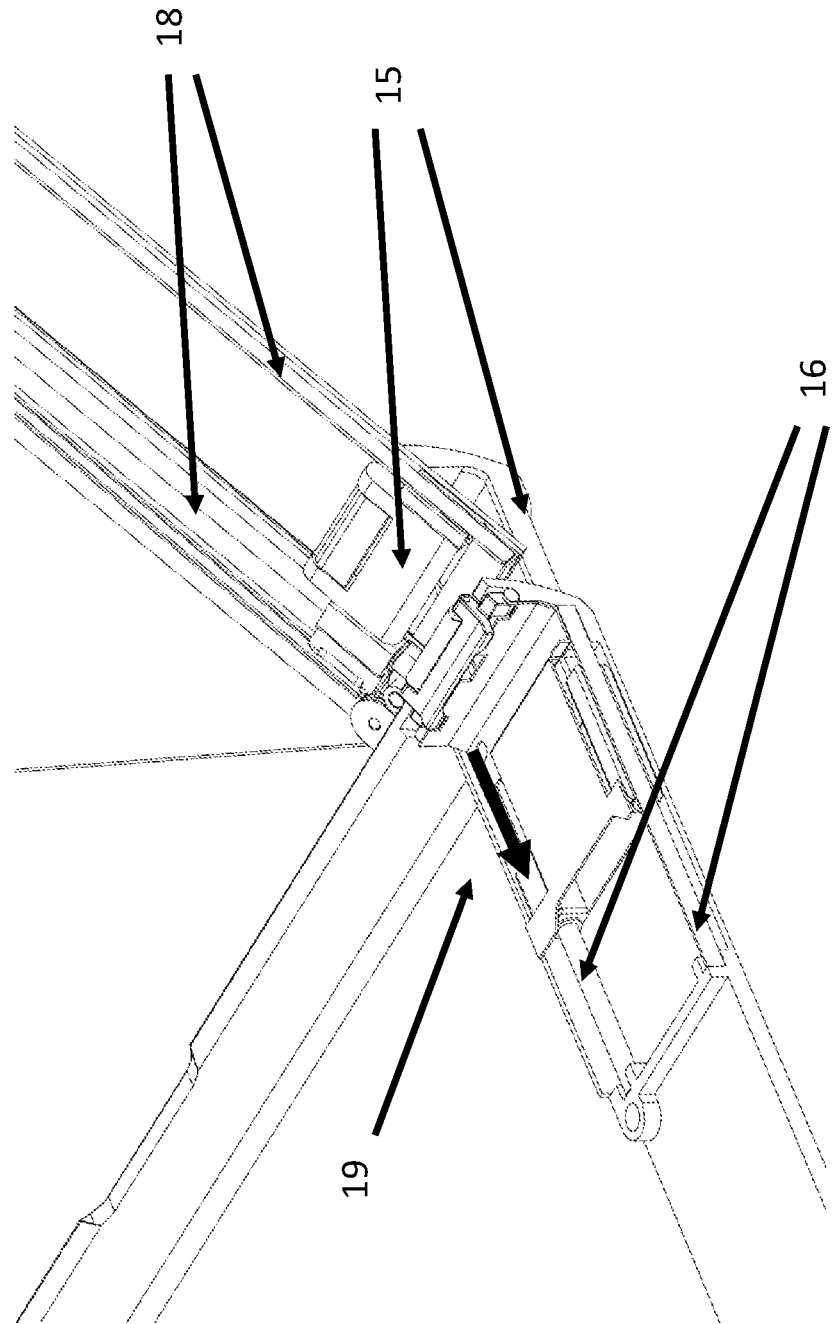

FIG. 27-31 take the FIG. 21-26 sequence, and give an enlarged view of the carriage 15 and the top pair of parallel rails 18 and bottom pair of parallel rails 16 and horizontal hinge 20 that enables the carriage rails in the top section to pivot through approximately 32 degrees. FIG. 31 also indicates the position of the compressed spring 17 that biases the carriage towards the front of the base section; it is shown by the arrow 17, indicating that it imposes a force biasing carriage 15 forwards.

Figure 32:
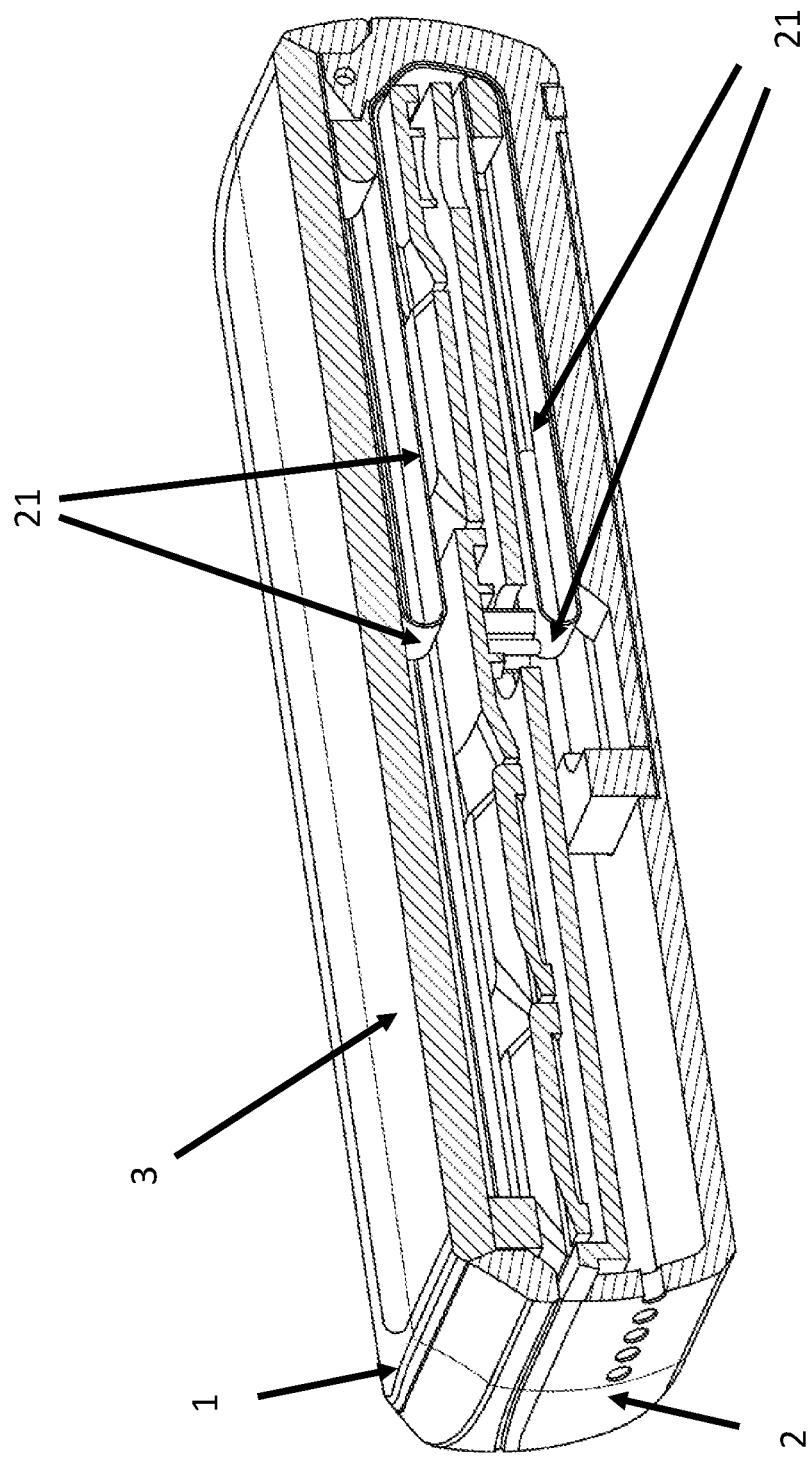
FIG. 32 shows a cross-section view of the device and the flexi-cables in the device, when the device is in the closed or smartphone mode position.

FIG. 32 shows a cross-section view of the device and the flexi-cables 21 in the device, when the device is in the closed or smartphone mode position. The flexi-cables 21 carry power from the main battery, positioned in the base section 2, to the components in the top section 1, including the touch screen display 3. The flexi-cables 21 are also bi-directional data cables.

Figure 33:
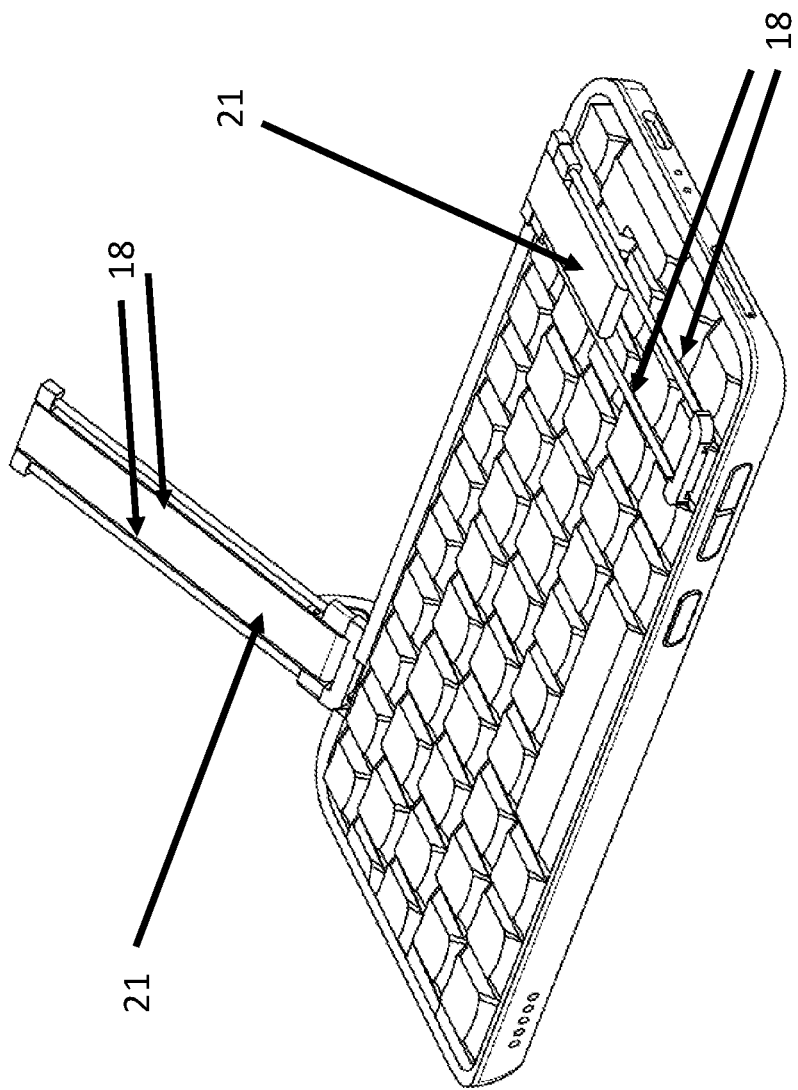
FIG. 33 shows how, as the rails pivot upwards as the top half is slid back and upwards, the flexi cables extend in between the rails of the carriage.

FIG. 33 shows how, as the rails pivot upwards as the top half is slid back and upwards, the flexi cables 21 extend in between the top rails 18 and bottom rails 16. The left hand top rails 18 are pivoted upwards, in keyboard mode, and the flexi cables 21 are fully extended along the length of top rails 18 because the top section is fully rearwards. The right hand top rails 18 are shown in smartphone mode, lying flat over the keyboard, and the flexi-cable 21 is now shown extended only part-way along top rails 18.

Figure 34:
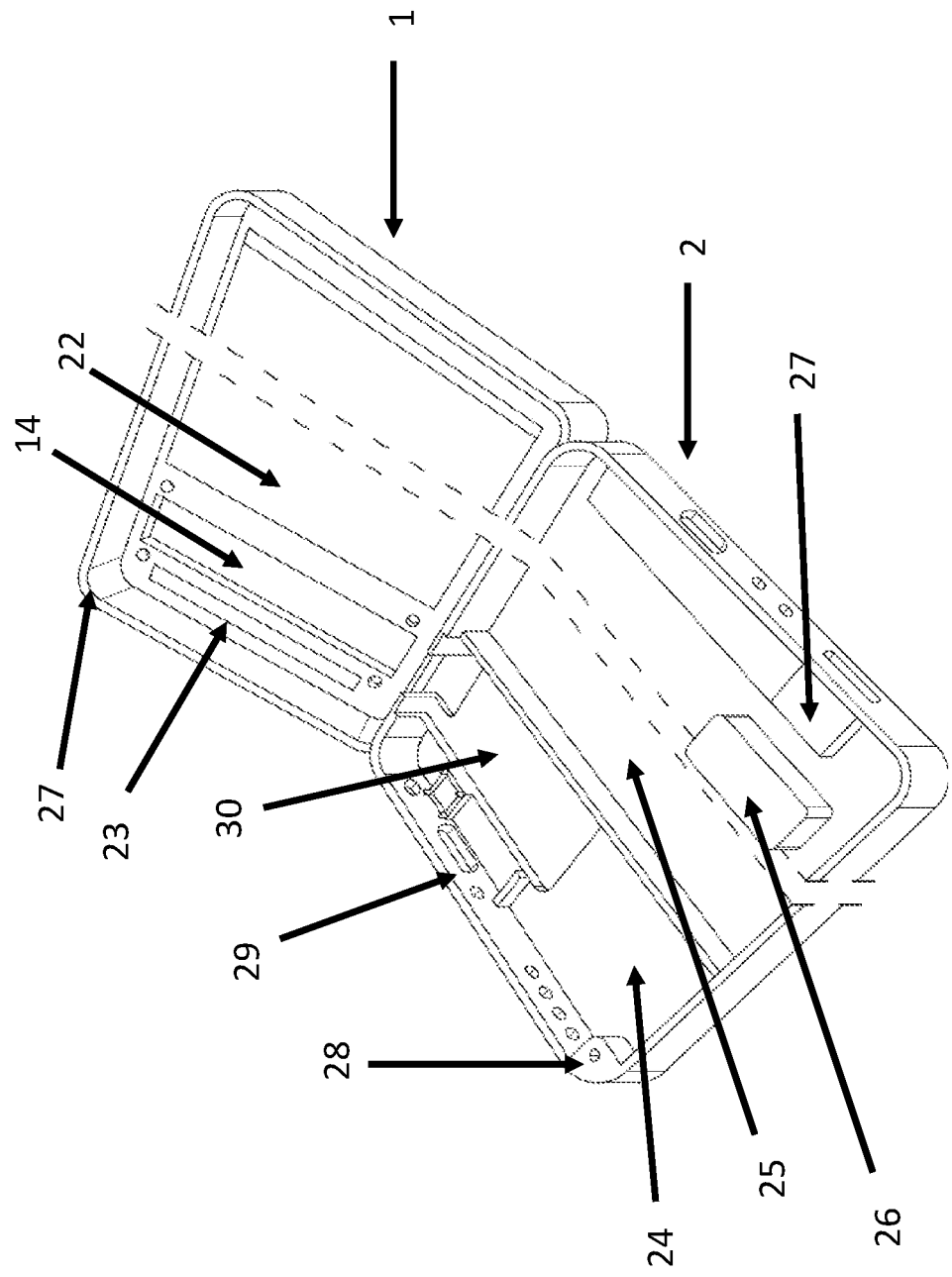
FIGS. 34 and 35 are schematic views of the internal arrangement inside the mobile device.
Figure 35:
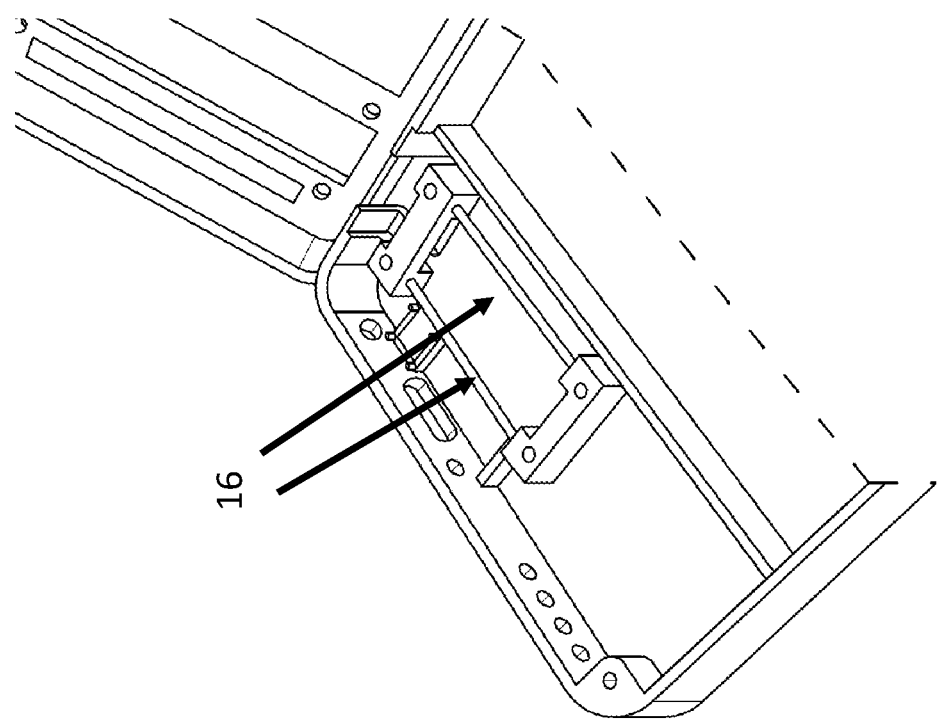

FIGS. 34 and 35 are schematic views of the internal arrangement inside the mobile device. These include PCB 22 (including CPU, GPU and 5G modem chipsets), antenna 23, speaker 24, battery 25, and camera unit 26. In addition, to ensure that the top section 1 remains close and parallel to the base section when the device is in smartphone mode, a magnet 27 is positioned in the top section, attracted to a magnet 28 in the bottom section. A metal strip 29 in the bottom section that the magnet in the top section is attracted to ensures that the top section grips the base section as it is moved rearwards and forwards. A carriage holder 30 retains the L-shaped sliding carriage (not shown). Gap 14 in the top section is for the sliding carriage to move along. FIG. 35 shows the parallel rails 16 in the base section that the L-shaped sliding carriage (not shown) moves along.

Figure 36:
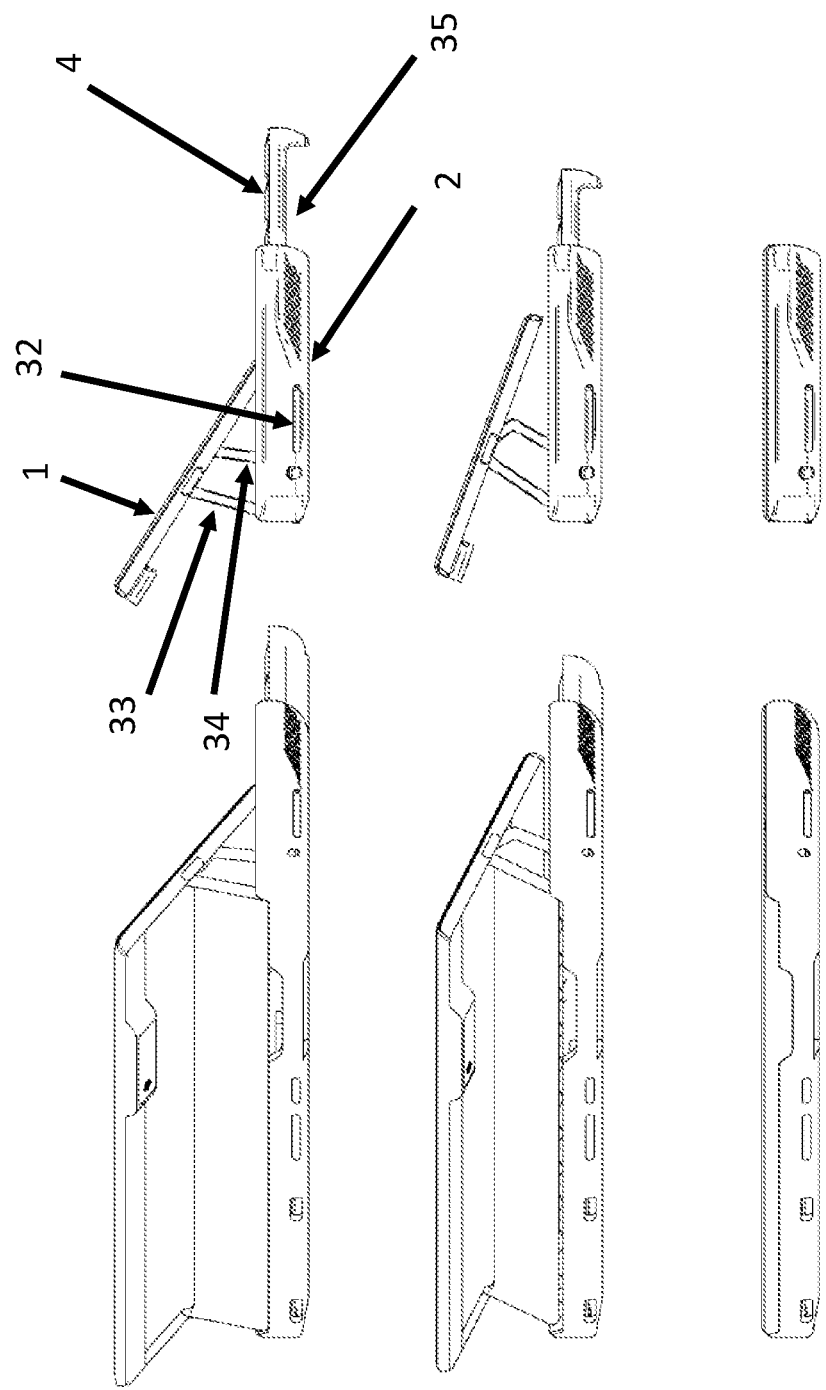
FIG. 36 are rear perspective and side views of a second variant of the mobile device, transforming using motors from keyboard or PC mode (top row) to smartphone mode (bottom row).

FIG. 36 are on the left hand side, three rear perspective of a second variant of the mobile device, transforming using motors from keyboard or PC mode (top row) to smartphone mode (bottom row), as opposed to the manual transformation described above in FIGS. 1-25. On the right hand side are corresponding side views of the device. A button 32 is pressed to activate a motor (not shown) in the base section 2 that, via gearing, rotates pivot arm 33; pivot arm 33 joins the top section 1 to the base section 2; it is supplemented with guide arm 34 that joins the top section 1 to the base section 2 and prevents twisting movement of the top section as it moves. A second motor 39 (not shown) in the base section turns a screw or worm drive 40 (not shown) that moves a tray 35 in which the keyboard 4 sits; the full extension is approximately 33 mm. The operation of the two motors is synchronised so that the top section (with touch screen display) pivots up from the smartphone mode to the keyboard mode at the same time as the keyboard 4 moves out of the base section 2. The start and stop times of the movement of top section 1 and keyboard tray 35 co-incide.

Figure 37:
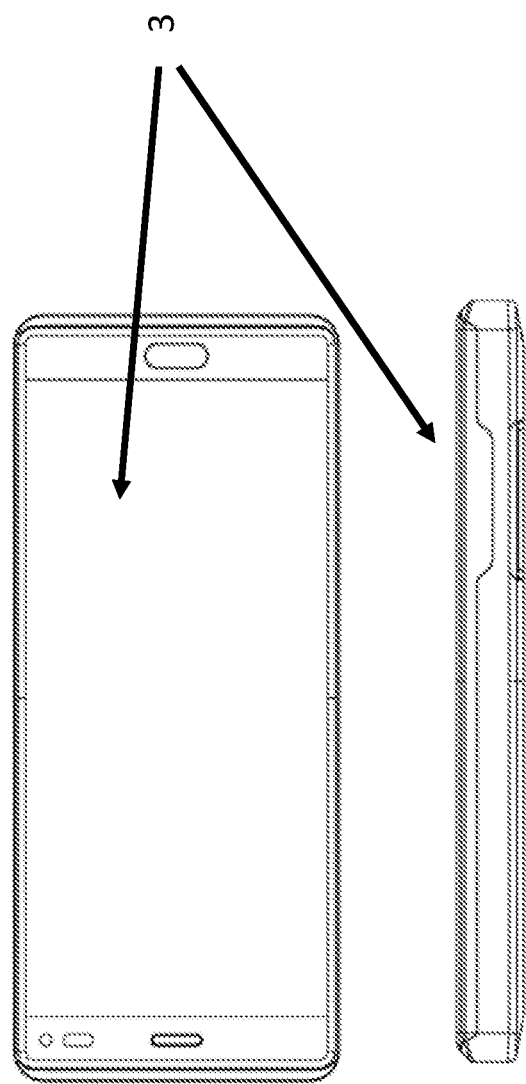
FIG. 37 is a top view and front view of the second variant, fully closed (i.e. in smartphone mode).

FIG. 37 is a top view and front view of the second variant, fully closed (i.e. in smartphone mode).

Figure 38:
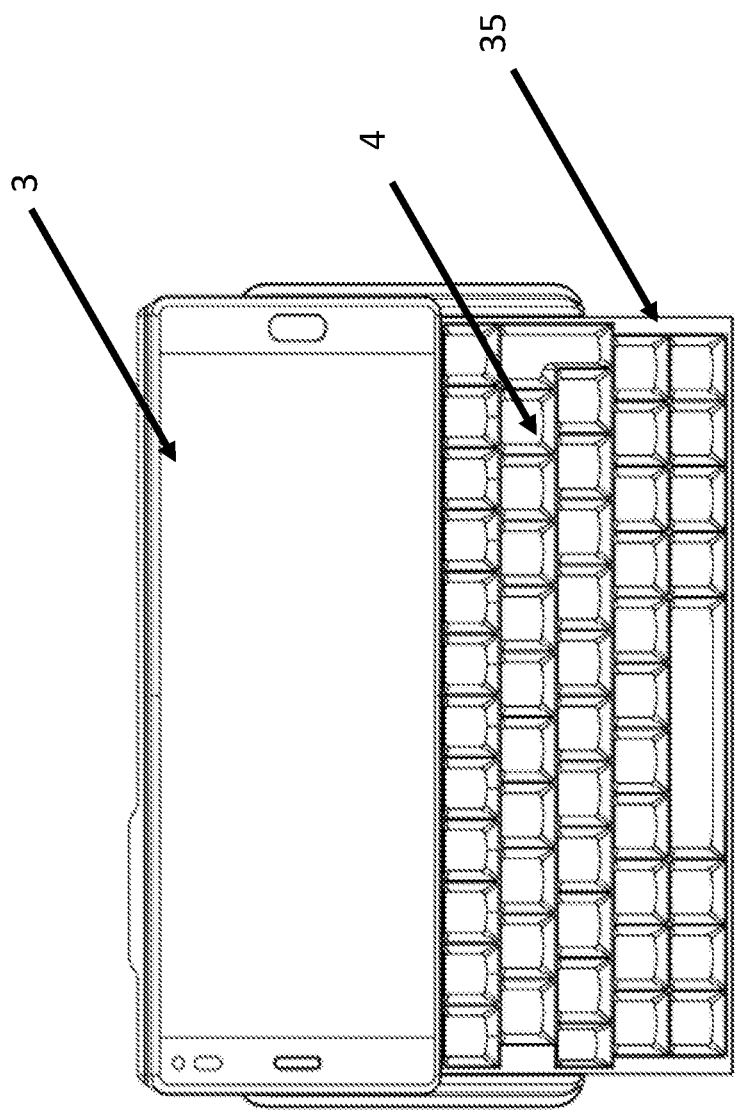
FIG. 38 is a top view of the second variant, open and in the keyboard mode, and showing how the keyboard and its associated tray slides out from the base section.

FIG. 38 is a top view of the second variant, open and in the keyboard mode, and showing how the keyboard 4 its associated tray 35 extended out from the base section.

Figure 39:
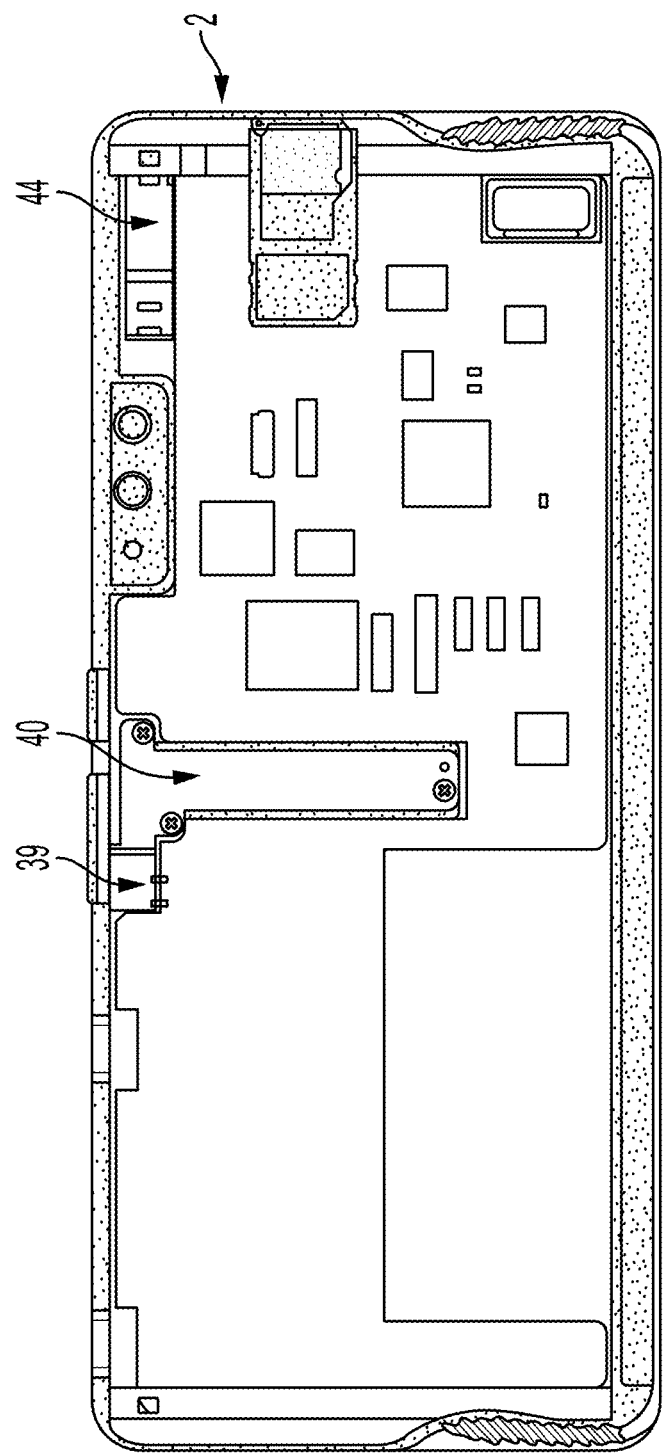
FIG. 39 is a plan view of the base section, showing the motor and associated screw drive that moves the keyboard tray backwards and forwards; and also the motor the rotates the pivot arms that support the top section and hence moves the top section from the closed or smartphone mode position to the open or keyboard/PC mode position.

FIG. 39 is a plan view of the base section 2 and showing the motor 39 and associated screw drive 40 that moves the keyboard tray 35 backwards and forwards. It also shows the motor 44 that is connected via gearing to rotate the pivot arm 33; pivot arm 33 supports the top section 1 and hence activating motor 44 moves the top section 1 from the closed or smartphone mode position to the open or keyboard/PC mode position and back again.

Figure 40:
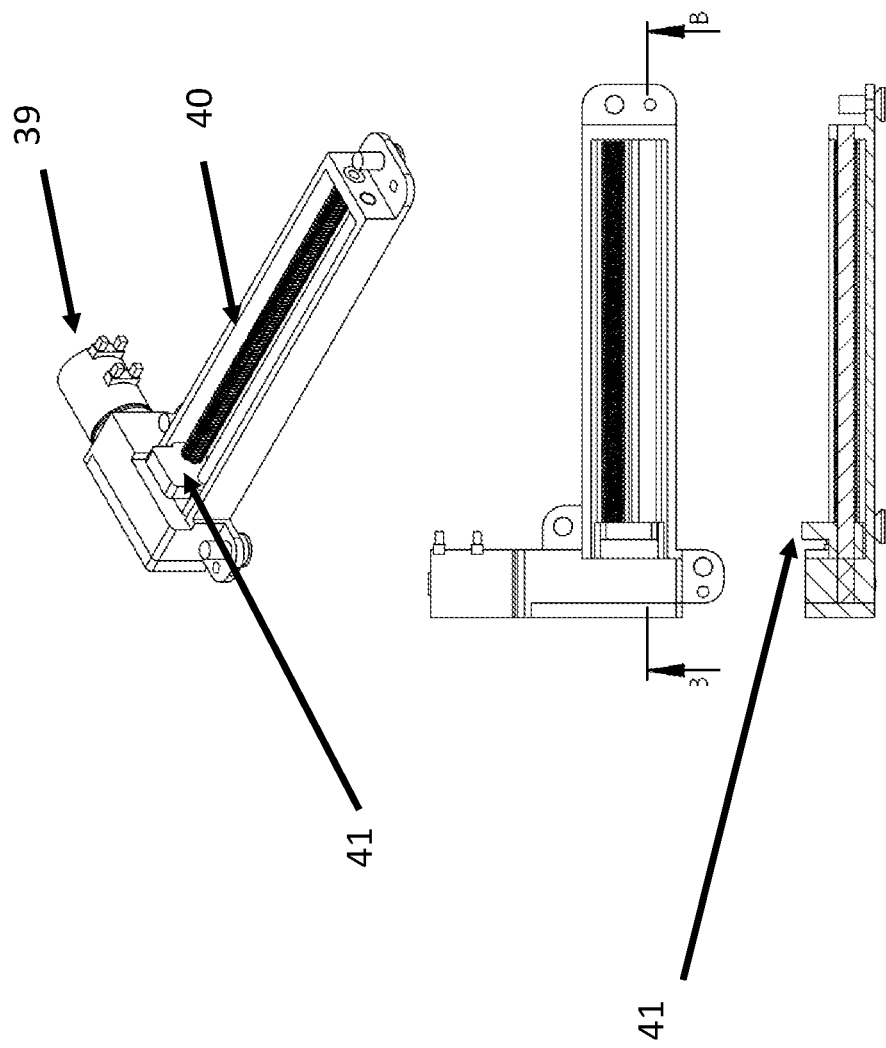
FIG. 40 are various views of the motor and associated screw drive that moves the keyboard tray backwards and forwards.

FIG. 40 are various views of the motor 39 and associated screw drive 40 that moves the keyboard tray 35 backwards and forwards. Screw drive 40 rotates to give linear movement to a lip 41 lip that engages with the tray underside to move the tray linearly in and out. This engagement is shown in FIG. 41.

Figure 41:
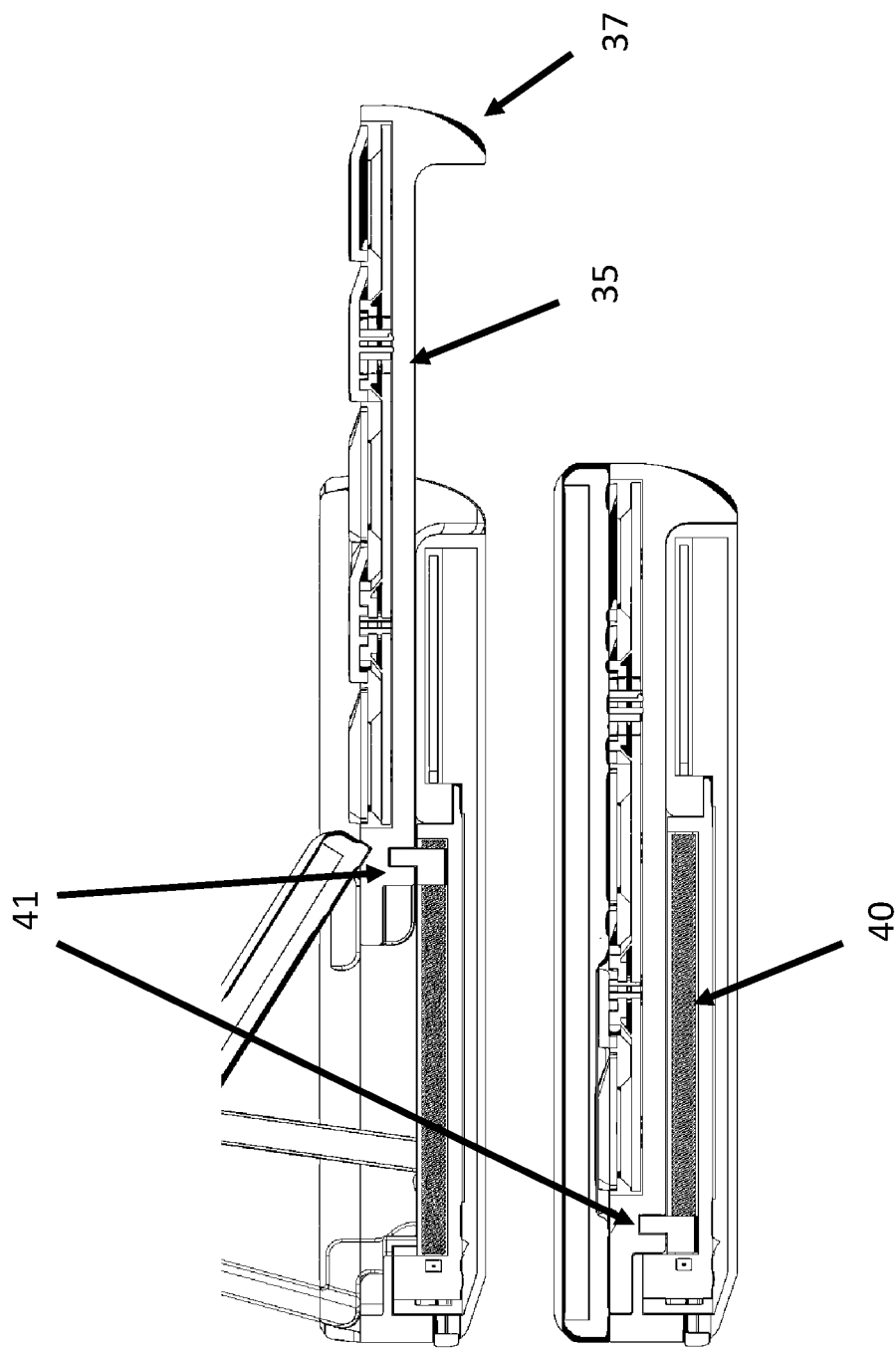
FIG. 41 shows (top image) a cross section through the second variant, with the keyboard fully extended and (lower image) a cross section through the second variant, with the keyboard fully retracted and the top section fully covering the base section.

FIG. 41 shows (top image) a cross section through the motorised variant, with the keyboard tray 35 fully extended and (lower image) a cross section through the second variant, with the keyboard tray 35 fully retracted and the top section fully covering the base section. Screw drive 40 moves lip 41 lip that engages with the tray underside to move the tray in and out. Tray 35 includes a stabilising foot 37 at the front of the tray.

Figure 42:
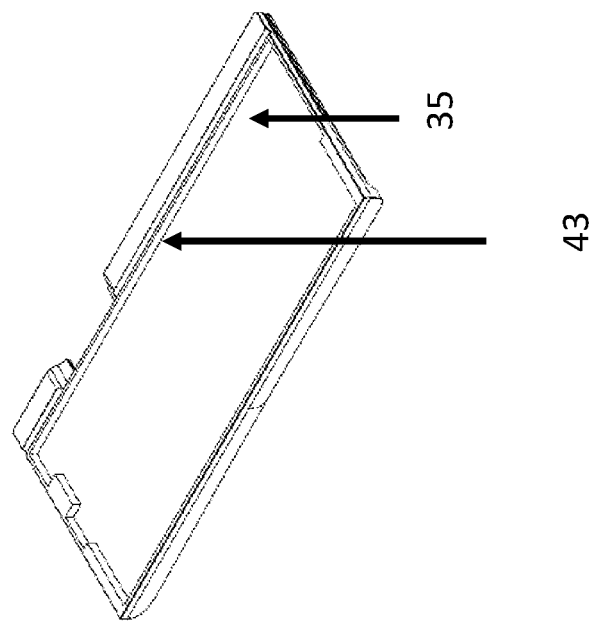
FIG. 42 are top and perspective views of the key board tray.
Figure 42:
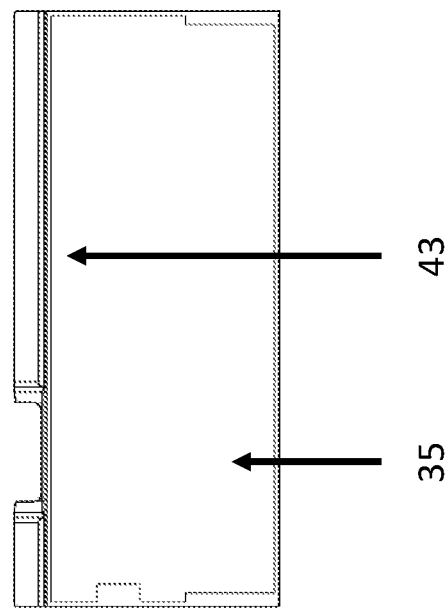

FIG. 42 are top and perspective views of the key board tray 35; it includes a groove 42 along each side edge of the tray to ensure tray slides in and out smoothly. It also includes a groove 43 along the rear edge of the tray 35 that the top section 1 drops down into when the tray is fully extended, to secure the top section at a 32 degree viewing angle. The motorised movements of the tray extension and the top section lift and pivot are co-ordinated so that the top section drops into the groove 43 along the rear edge of the tray 35.

Figure 43:
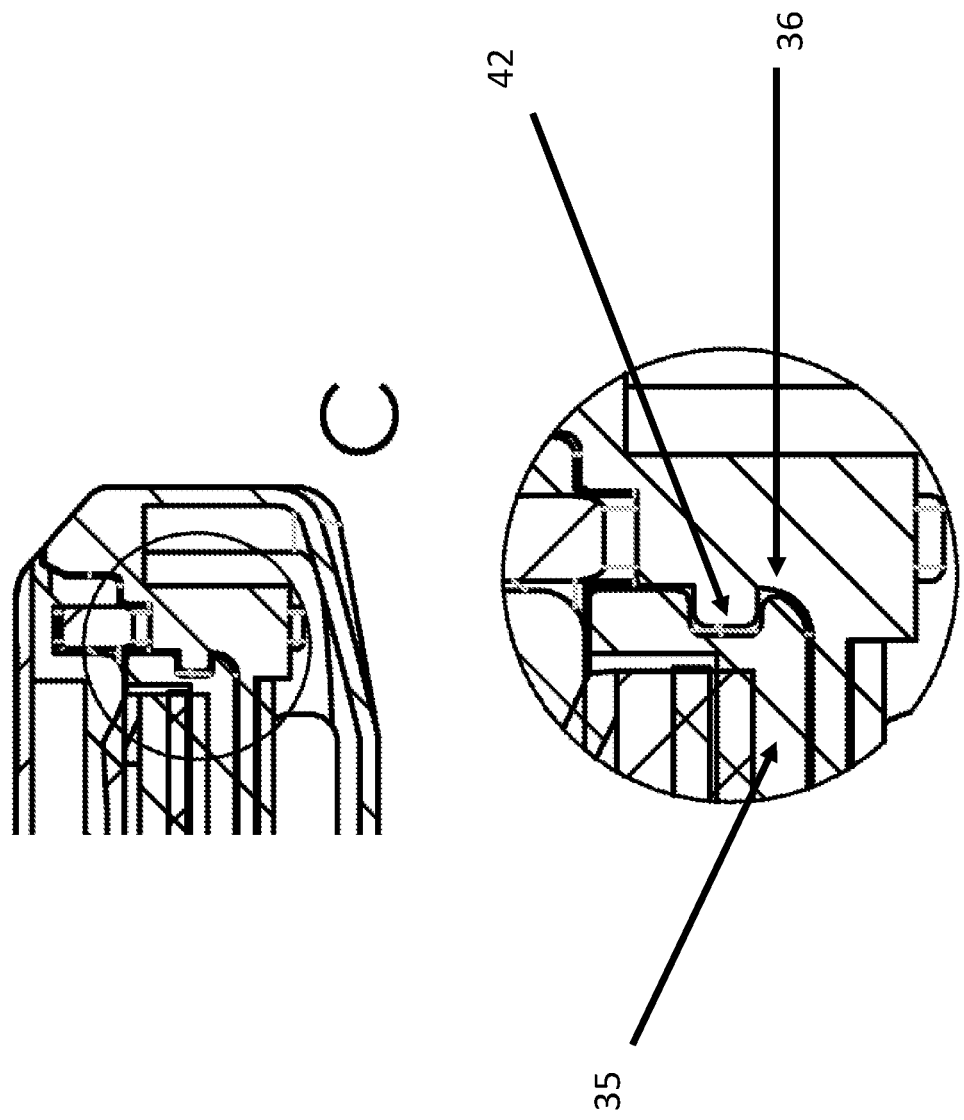
FIG. 43 are cross-sectional views along a plane parallel to the front edge of the device, showing the base section grooves along which the keyboard tray slides.

FIG. 43 are cross-sectional views along a plane parallel to the front edge of the device, showing the groove 42 along a side edge of the tray 35 and which controls the sliding motion of the tray 35. Base section 2 includes an internal slide track 36 for keyboard tray that engages with groove 42.

Figure 44:
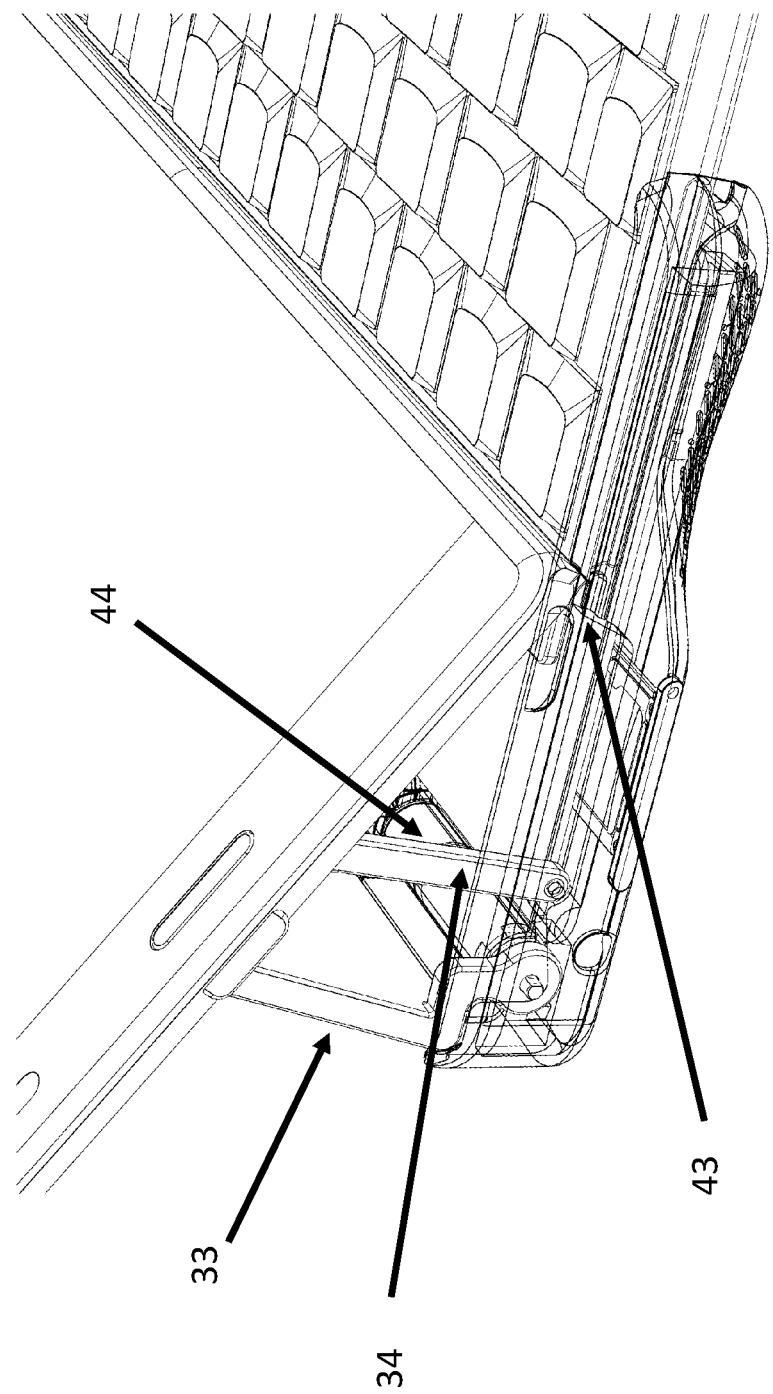
FIG. 44 is a perspective view showing the pivot arms that connect the top section to the base section and the related motor that rotates the pivot arms.

FIG. 44 is a perspective view showing the pivot arm 33 that connects the top section to the base section and the related motor 44 that rotates the pivot arm. Guide arm 34 is also shown. The front edge of the top section can be seen resting in groove 43 that runs along the rear edge of the keyboard tray 35.

Figure 45:
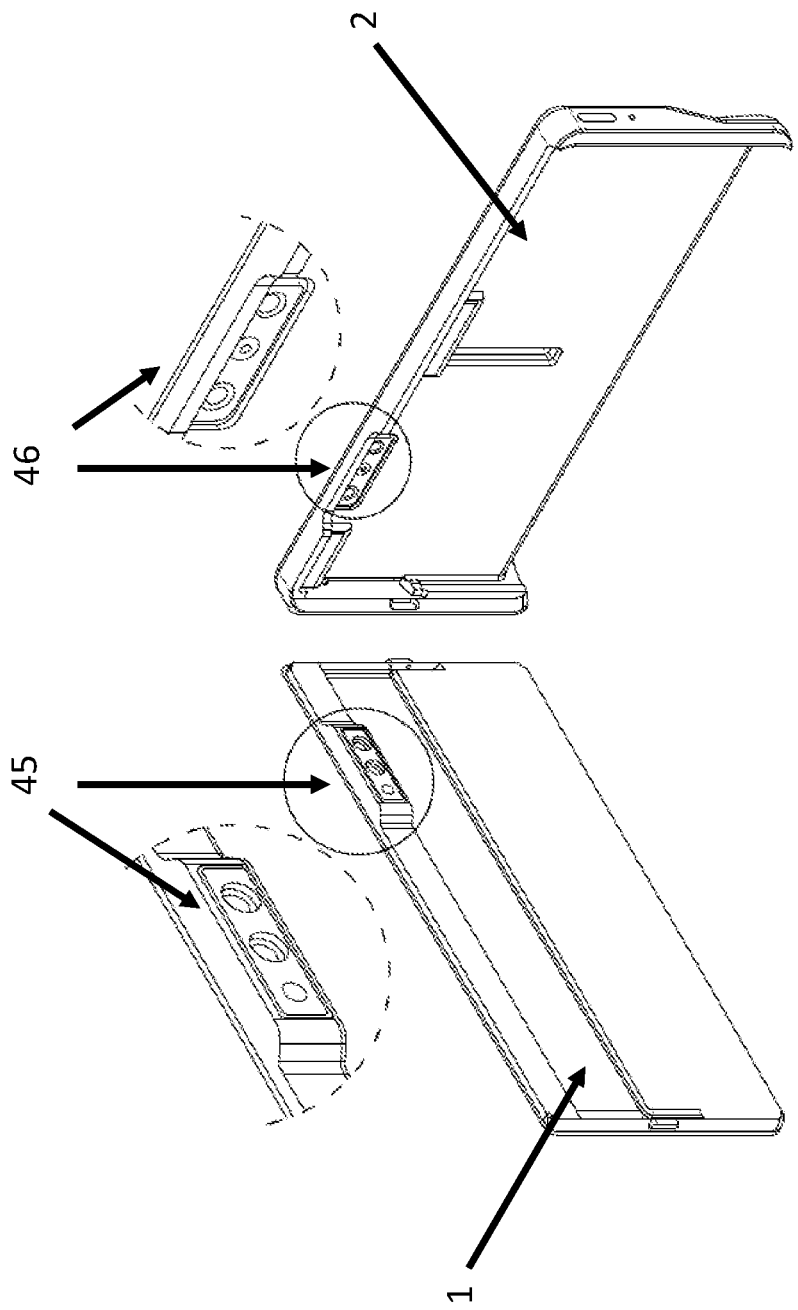
FIG. 45 shows an enhanced camera group in the top section and corresponding enhanced lens group in the base section.

FIG. 45 shows an enhanced camera group 45 in the top section 1 and corresponding enhanced lens group 46 in the base section 2; then the device is in smartphone mode, the enhanced camera group 45 mates with the enhanced lens group 46; this arrangement enables a more complex and thicker lens arrangement to be deployed in the enhanced lens group 46, compared to what would be possible if the lenses were all part of the enhanced camera group 45 in the top section. Enhanced camera group 45 includes two image sensors and one flash unit.

APPENDIX 1: SUMMARY OF FEATURES

A First Aspect is:

A portable, electronic device configured to transform between two different usage modes, in which the device includes (i) a base section and (ii) a top section that includes a touchscreen display that sits over the base section when the device is in a first mode, a smartphone mode; and where the device is configured to enable the top section to slide back over the base section, moving parallel to a top surface of the base section, into a second mode that fully exposes the entire base section.

Optional features: any one or more of the following optional features can be used with any one or more other optional features.

Modes
- the first usage mode is a smartphone mode and the second usage mode is a keyboard mode, in which a keyboard in the base section is fully exposed once the top section has slid back fully over the base section, and the top section is configured to tilt to a viewing angle above the keyboard.
- software automatically configures the touch screen display to portrait mode when the device is in smartphone mode and automatically configures the touch screen display to landscape mode when the device is in keyboard mode.
- software automatically configures the touch screen display, including on-screen icons, to portrait mode during the device transformation from keyboard mode to smartphone mode and automatically configures the touch screen display, including on-screen icons, to landscape mode during the device transformation from smartphone mode to keyboard mode.
- the first mode is a smartphone mode and the second mode is a double screen mode, in which a second display in the base section is fully exposed once the top section has slid back fully over the base section, and the touchscreen display in the top section is configured to lie co-planar with the second display in the base section.

Sliding Carriage
- the top section is mechanically connected to the base section via at least one sliding carriage that is configured to enable the top section to slide back over the base section, moving parallel to a top surface of the base section the top section is mechanically connected to the base section via at least one sliding carriage that is configured to slide linearly in the base section the sliding carriage is configured to slide linearly along tracks, rails or rods in the base section.

the carriage is configured to slide linearly in tracks, rails or rods in the top section.

the rods are made from a spring wire material, and are configured to bend under load, thus helping to absorb any shock from dropping the device the rods are used to carry the power between the base and top sections the lower part of the carriage or linear sliding element is biased towards the front of the base section by a spring.

there are a pair of carriage mechanisms, positioned towards the edges of the keyboard.

The sliding carriage is configured to enable movement of the top section relative to the carriage and also movement of the base section relative to the carriage the sliding carriage is configured to slide backwards and forwards along bottom rails that are fixed in the base section and the top section is also configured to slide backwards and forwards relative to the sliding carriage along rails that are fixed in the top section.

the sliding carriage is configured so that, as the user manually pushes the top section rearwards relative to the base section, the top rails slide rearwards through guide members in the top on the sliding carriage until the top section reaches the end of its travel; then, as the user continues to apply rearwards pressure on the top section, the sliding carriage slides backwards along the bottom rails that are located in the base section, until the sliding carriage reaches the end of the bottom rails and, at that point, top section has moved fully rearwards, past the rear edge of the base section.

Tilting Action the second mode is a keyboard mode in which the top section is configured to tilt to a reading angle after it has slid backwards over the base section the reading angle is approximately 32 degrees, plus or minus 5 degrees.

At the rear of the sliding carriage is a horizontally hinged joint, which connects via a fixed crank (e.g. a 90 degree crank) to a lower carriage or linear sliding element which is configured to slide in a track in the base section.

Top section is configured so that the front edge of the display element travels past the rear edge of the base section and at this point the horizontally hinged joint allows the front edge of the display element to drop down over the rear profile of the base section.

When the front edge of the top section drops down, the top section pivots upwards, until the front edge touches the sliding carriage.

The font edge of the top section and the rear edge of the base section are shaped such that a spring relaxes during this tilting, acting to clip the screen at this angle.

the angled, resting position of an edge of the top section is arranged such that it is flush with a rear edge of the base section.

User Interaction in the first mode, the device operates as a touchscreen display smartphone in which user interaction arises principally through the top section touch screen display.

in the second mode, the device enables a user to interact with both the touchscreen display in the top section and also a keyboard or second screen in the base section.

in the second mode, the touchscreen display in the top section is angled with respect to the base section Sliding Action attracting magnets are placed near the front corners of the top section and the base section.

the magnets align the top section and the base section when in a closed position, and also hold them together.

a rail of ferrous material is located in the base section under each top section magnet.

The top section is attracted to the ferrous material in the keyboard element over the whole of its sliding travel movement The top section is attracted to the ferrous material in the keyboard element over the whole of its sliding travel, but more so at the front where the other magnets are, so the top and base sections are encouraged to align by the magnet to magnet force, which is stronger than the magnet to ferrous rail force.

There is a pair of rollers with a fixed axle, where each roller is located close to each front corner on the underside of the top section, configured to encourage parallel travel, and reduce friction too, so that the sliding action is smooth the rollers are shaped to run in grooves or engage with rails to keep them running straight, thus resisting any rotational motion.

the rollers are magnetic.

Cable Management

The sliding carriage mechanism is constructed to accept a flexible cable running through it.

The sliding carriage mechanism includes a sliding carriage and parallel tracks, rails, rods that the sliding carriage is configured to slide along, and the flexible cable runs in the gap between the parallel tracks, rails, or rods.

The sliding carriage mechanism is constructed to accept a flexible cable running through it and past the horizontal hinge, where the flexible cable is bent back on itself under each sliding part to allow for the positional change from the end connection points to the horizontal hinge in the centre.

Second Screen Mode

A second display is in the base section and forms substantially all of the top surface of the base section the second mode is a dual screen mode in which both the display in the top section is substantially co-planar with the display in the base section the underlying display in the bass section turns on automatically during the opening process the edges are thin between the two screens, and the two screens display a single image or two separate screens.

Motorised Mode the device includes one or more motors that are configured to automatically transform the device between the usage modes at least one motor is configured to move a keyboard tray in and out of the base section at least one motor is configured to move a keyboard tray in and out of the base section to follow expose all keys in the keyboard at least one motor is configured to move a keyboard tray in and out of the base section using a screw drive at least one motor is configured to lift and lower the top section up from and down to the base section by rotating a pivot arm the device is configured so that a simultaneous motorised action or actions starts both the keyboard tray movement and also the top section pivot movement at substantially the same time the device is configured so that a simultaneous motorised action or actions completes both the keyboard tray movement and also the top section pivot movement at substantially the same time the device is configured so that motorised action or actions synchronises the keyboard tray movement and also the top section pivot movement so that the top section engages with a groove or other feature in the base section, keyboard or keyboard tray.

Other Features the device includes a keyboard backlight that is configured to flash, for example with a changing backlight intensity, while the keyboard tray is moving the device includes a camera/imaging module in the top section, with lens in the base section that align with the top section in the first mode, or vice versa.

the base section includes an additional lens set in the base section that align with a camera module and primary camera lens that are in the top section the base section is aligned with a camera module and primary camera lens in the top section for one or more of the following: creating a more powerful lens set; creating additional magnification; creating additional focal length; creating additional field of view.

the device includes a flash module on the top section that closes onto the base section and the base section includes an aligned aperture or lens through which the flash can operate Other Aspects A portable, electronic device configured to transform between two different usage modes, in which the device includes (i) a base section and (ii) a top section that includes a touchscreen display that sits over the base section when the device is in a first mode, a smartphone mode; and where the device is configured to enable the top section to pivot back over the base section, moving to a second mode that at least in part exposes the base section; and in which one or more motors automatically move the top section during the transformation between the two different usage modes.

Note that the above 'optional features' may also be independent of the key feature and may be combined with any other optional feature.

APPENDIX 2 TECHNICAL SPECIFICATION

| | | Specification |
|---|---|---|
| Network: | Wi-Fi | WiFi 5 2T2R 802.11 a/b/g/n/ac/e/k/r/h |
| | Modem | 5G World-wide modem (5G + 4G) |
| | | 3GPP Rel. 15 |
| | | NSA/SA |
| | | DL 2.34 Gbps (theoretical) |
| | | 2CC 2.34 Gbps (theoretical) |
| | | 2CC Sub-6 GHz |
| | | 2G/3G/4G/5G Multi-Mode |
| | GSM/GPRS/ EDGE | GSM: 850/900/1800/1900 MHz |
| | WCDMA/ HSPA+ | UMTS: B1/2/5/6/8 |
| | CDMA/ | BC0(800 MHz)/BC1(1900 MHz) |

-continued

| | | Specification |
|---|---|---|
| | CDMA-EVDO1X | |
| | TDD-LTE | B34/B38/B39/40/41(Full) |
| | 4G LTE bands | B1/B2/B3/B4/B5/B7/B8/B12/B17/B18/B19/ B20/B26/B38/B39/B40/B41/B66/B71 |
| | 5G bands | N1/N3/N28/N38/N41/N77/N78/N79 |
| | VoLTE | Compatible |
| | ViLTE | Compatible |
| | VoWi-Fi | Compatible |
| | Dual SIM operation | Dual 5G Modem |
| Body: | Form Factor | Manual slider/motorised transformer |
| | Dimensions | 17.24 (W) × 7.65 (D) × 1.78 (H) cm, 1.87 with camera protrusion (H) |
| | Weight | Approx 300 g |
| | SIM | Dual nanoSIM + eSIM (both SIMs can be used at same time as micro SD card) |
| Display: | Type | AMOLED Colour FHD+ (20:9) |
| | Size | 6.39 inch |
| | Resolution | 2340 × 1080, 403 ppi |
| | Multi Touch | Yes |
| | Protection | Gorilla glass (Corning 3rd Gen) |
| Platform: | OS | Android 11 OS, Linux OS compatible |
| | Chipset | Dimensity 800 Mediatek MT6873 Octa-Core 5G SoC |
| | CPU | 4 * Cortex A76 @ 2.0 GHz |
| | | 4 * Cortex A55 @ 2.0 GHz |
| | GPU | Arm Mali-G57 MC4 GPU Manhattan 3.0: 52 fps |
| | APU | 3rd Generation Quad-core APU 3.0 Up to 2.5TOPS |
| Memory: | RAM | 8 GB - Ultra-fast 4-channel LPDD4x |
| | Card Slot | microSD |
| | Internal | 128 GB |
| Camera: | Rear Camera | 48 MP + Flash |
| | Front Camera | 13 MP |
| Sound: | Speakers | Stereo Speakers |
| | Microphone | integrated ambient Microphone |
| | 3.5 mm Jack | Yes |
| Comms: | WLAN | 802.11 a/b/g/n/ac/e/k/r/h |
| | Bluetooth | BT 5.1 |
| | GPS | AGPS, Glonass, Beidou, Galileo Band L1 + L5 GNSS |
| | NFC | Yes, including payment |
| | FM Radio | Yes |
| | USB | 2x USB Type C, OTG support, Display Port support (via adapter cable) |
| Features: | Keyboard | Mechanical full keyboard 24 Layouts Arabic, Chinese, Croatian, Czech, Dvorak, Finnish/Swedish, French, German, Greek, Hebrew, Hungarian, Icelandic, Italian, Japanese, Korean, Norwegian/Danish, Polish, Portuguese, Russian, Spanish, Swiss, Thai, English UK, English US |
| | Charging | 10 W Qi Wireless charging + Fast charging |
| | Sensors | Accelerometer, compass, light sensor, gyro, magneto-sensor |
| | Fingerprint | Finger print sensor on side on/off button |
| | Buttons | Volume up/down, on/off/lock button with fingerprint sensor, smart control button |
| Battery: | | 3500 mAh |
| | | 4.4 V polymer lithium battery |
| — | Power Save Technology | MediaTek 5G UltraSave |
| Misc: | Colour | Black |

The invention claimed is:

1. A portable, electronic device configured to transform between two different usage modes, in which the device includes (i) a base section and (ii) a top section that includes a touchscreen display that sits over the base section when the device is in a first mode, a smartphone mode; and where the device is configured to enable the top section to slide back over the base section, moving parallel to a top surface of the base section, into a second mode that fully exposes the entire base section;

in which the top section is mechanically connected to the base section via at least one sliding carriage that is configured to enable the top section to slide back over the base section, moving parallel to a top surface of the base section, and in which the sliding carriage is configured to enable movement of the top section relative to the carriage and also movement of the base section relative to the carriage.

2. The portable, electronic device of claim 1 in which the first usage mode is a smartphone mode and the second usage mode is a keyboard mode, in which a keyboard in the base section is fully exposed once the top section has slid back fully over the base section, and the top section is configured to tilt to a viewing angle above the keyboard.

3. The portable, electronic device of claim 1 in which software automatically configures the touch screen display to portrait mode when the device is in smartphone mode and automatically configures the touch screen display to landscape mode when the device is in keyboard mode.

4. The portable, electronic device of claim 3 in which software automatically configures the touch screen display, including on-screen icons, to portrait mode during the device transformation from keyboard mode to smartphone mode and automatically configures the touch screen display, including on-screen icons, to landscape mode during the device transformation from smartphone mode to keyboard mode.

5. The portable, electronic device of claim 1 in which the first mode is a smartphone mode and the second mode is a double screen mode, in which a second display in the base section is fully exposed once the top section has slid back fully over the base section, and the touchscreen display in the top section is configured to lie co-planar with the second display in the base section.

6. The portable, electronic device of claim 1 in which the top section is mechanically connected to the base section via at least one sliding carriage that is configured to slide linearly in the base section.

7. The portable, electronic device of claim 6 in which the sliding carriage is configured to slide linearly along tracks, rails or rods in the base section.

8. The portable, electronic device of claim 6 in which the sliding carriage is configured to slide linearly in tracks, rails or rods in the top section.

9. The portable, electronic device of claim 6 in which the sliding carriage is configured to slide linearly along rods and in which the rods are made from a spring wire material, and are configured to bend under load, thus helping to absorb any shock from dropping the device.

10. The portable, electronic device of claim 1 in which there are a pair of carriage mechanisms, positioned towards the edges of the keyboard.

11. The portable, electronic device of claim 1 in which the sliding carriage includes top rails and bottom rails and in which the sliding carriage is configured to slide backwards and forwards along the bottom rails that are fixed in the base section and the top section is also configured to slide backwards and forwards relative to the sliding carriage along top rails that are fixed in the top section.

12. The portable, electronic device of claim 1 in which the sliding carriage includes top rails and bottom rails and in which the sliding carriage is configured so that, as the user manually pushes the top section rearwards relative to the base section, the top rails slide rearwards through guide members in the top on the sliding carriage until the top section reaches the end of its travel; then, as the user continues to apply rearwards pressure on the top section, the sliding carriage slides backwards along the bottom rails that are located in the base section, until the sliding carriage reaches the end of the bottom rails and, at that point, top section has moved fully rearwards, past the rear edge of the base section.

13. The portable, electronic device of claim 1 in which the second mode is a keyboard mode in which the top section is configured to tilt to a reading angle after it has slid backwards over the base section.

14. The portable, electronic device of preceding claim 13 in which the reading angle is approximately 32 degrees, plus or minus 5 degrees.

15. The portable, electronic device of claim 13 in which at the rear of the sliding carriage is a horizontally hinged joint, which connects via a fixed crank to a lower carriage or linear sliding element which is configured to slide in a track in the base section.

16. The portable, electronic device of claim 13 in which the top section is configured so that the front edge of the display element travels past the rear edge of the base section and at this point the horizontally hinged joint allows the front edge of the display element to drop down over the rear profile of the base section.

17. The portable, electronic device of preceding claim 16 in which, when the front edge of the top section drops, the top section pivots upwards, until the lower front edge touches the sliding carriage.

18. The portable, electronic device of claim 17 in which the font edge of the top section and the rear edge of the base section are shaped such that a spring relaxes during tilting, acting to clip the screen at this tilting angle.

19. The portable, electronic device of claim 13 in which the angled, resting position of an edge of the top section is arranged such that it is flush with a rear edge of the base section.

20. The portable, electronic device of claim 1 in which, in the first mode, the device operates as a touchscreen display smartphone in which user interaction arises principally through the top section touch screen display.

21. The portable, electronic device of claim 20 in which, in the second mode, the device enables a user to interact with both the touchscreen display in the top section and also a keyboard or second screen in the base section.

22. The portable, electronic device of claim 20 in which, in the second mode, the touchscreen display in the top section is angled with respect to the base section.

23. The portable, electronic device of claim 1 in which attracting magnets are placed near the front corners of the top section and the base section.

24. The portable, electronic device of preceding claim 23 in which the magnets align the top section and the base section when in a closed position, and also hold them together.

25. The portable, electronic device of claim 1 in which a sliding carriage mechanism and is constructed to accept a flexible cable running through it.

26. The portable, electronic device of preceding claim 25 in which the sliding carriage mechanism includes a sliding carriage and parallel tracks, rails, rods that the sliding carriage is configured to slide along, and the flexible cable runs in the gap between the parallel tracks, rails, or rods.

27. The portable, electronic device of claim 25 in which the sliding carriage mechanism is constructed to accept a flexible cable running through it and past a horizontal hinge, where the flexible cable is bent back on itself under each sliding part to allow for a positional change from the end connection points to the horizontal hinge in the centre.

28. The portable, electronic device of claim 1 in which a second display is in the base section and forms substantially all of the top surface of the base section.

29. The portable, electronic device of claim 28 in which the second mode is a dual screen mode in which both the display in the top section is substantially co-planar with the display in the base section.

30. The portable, electronic device of claim 28 in which a display in the base section turns on automatically during the opening process or transformation from the first usage mode.

31. The portable, electronic device of claim 28 in which the two display screens display a single image.

32. The portable, electronic device of claim 1 in which the first usage mode is a smartphone mode and the second usage mode is a keyboard mode and the device includes a keyboard backlight that is configured to flash, for example with a changing backlight intensity, while a keyboard tray is moving.

33. The portable, electronic device of claim 1 in which the device includes a camera/imaging module in the top section, with lens in the base section that align with the top section in the first mode, or vice versa.

34. The portable, electronic device of preceding claim 33 in which the base section includes an additional lens set in the base section that align with a camera module and primary camera lens that are in the top section.

35. The portable, electronic device of claim 33 in which the base section is aligned with a camera module and primary camera lens in the top section for one or more of the following: creating a more powerful lens set; creating additional magnification; creating additional focal length; creating additional field of view.

36. The portable, electronic device of claim 33 in which the device includes a flash module on the top section that closes onto the base section and the base section includes an aligned aperture or lens through which the flash can operate.

37. A portable, electronic device configured to transform between two different usage modes, in which the device includes (i) a base section and (ii) a top section that includes a touchscreen display that sits over the base section when the device is in a first mode, a smartphone mode; and where the device is configured to enable the top section to slide back over the base section, moving parallel to a top surface of the base section, into a second mode that fully exposes the entire base section;

in which the second mode is a keyboard mode in which the top section is configured to tilt to a reading angle after it has slid backwards over the base section and in which at the rear of a sliding carriage is a horizontally hinged joint, which connects via a fixed crank to a lower carriage or linear sliding element which is configured to slide in a track in the base section.

38. A portable, electronic device configured to transform between two different usage modes, in which the device includes (i) a base section and (ii) a top section that includes a touchscreen display that sits over the base section when the device is in a first mode, a smartphone mode; and where the device is configured to enable the top section to slide back over the base section, moving parallel to a top surface of the base section, into a second mode that fully exposes the entire base section;

in which the top section is mechanically connected to the base section via at least one sliding carriage that is configured to enable the top section to slide back over the base section, moving parallel to a top surface of the base section, and in which the sliding carriage includes top rails and bottom rails and in which the sliding carriage is configured to slide backwards and forwards along the bottom rails that are fixed in the base section and the top section is also configured to slide backwards and forwards relative to the sliding carriage along top rails that are fixed in the top section.

\* \* \* \* \*